United States Patent
Moir et al.

(10) Patent No.: US 9,600,797 B2
(45) Date of Patent: Mar. 21, 2017

(54) SYSTEMS AND METHODS FOR FREIGHT TRACKING AND MONITORING

(75) Inventors: William Mark Moir, Alpharetta, GA (US); Scott Christopher Vandy, Midlothian, VA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

(21) Appl. No.: 12/201,672

(22) Filed: Aug. 29, 2008

(65) Prior Publication Data

US 2010/0057593 A1 Mar. 4, 2010

Related U.S. Application Data

(63) Continuation of application No. 12/201,533, filed on Aug. 29, 2008.

(51) Int. Cl.
| | | |
|---|---|---|
| G06F 19/00 | (2011.01) | |
| G06Q 10/08 | (2012.01) | |
| G01G 19/08 | (2006.01) | |
| G01G 19/415 | (2006.01) | |
| G01G 23/00 | (2006.01) | |

(Continued)

(52) U.S. Cl.
CPC ..... *G06Q 10/08345* (2013.01); *G01G 19/083* (2013.01); *G01G 19/415* (2013.01); *G01G 23/002* (2013.01); *G01G 23/3735* (2013.01); *G01G 23/42* (2013.01); *G06Q 10/08* (2013.01); *G06Q 10/0875* (2013.01); *H04N 7/18* (2013.01)

(58) Field of Classification Search
CPC ............... G01G 19/083; G01G 19/415; G01G 23/3735; G01G 23/3742; G01G 23/42; G06Q 10/08; G06Q 30/0283; B60G 2300/04; B60G 2400/61; B60G 2600/042; B60P 1/00

See application file for complete search history.

(56) References Cited

U.S. PATENT DOCUMENTS 5,347,274 A * 9/1994 Hassett ................. G01S 13/765
340/988
5,448,220 A   9/1995 Levy
(Continued)

FOREIGN PATENT DOCUMENTS

| CA | 2342268 | 3/2001 |
|---|---|---|
| WO | WO 2007-044746 | 4/2007 |

OTHER PUBLICATIONS

Logistics Control; High Performance Systems from Locanis Systemintegration Optimise Logistics in the beverages industry; http://locanis.com/english/press/2006/ident_2006_4_Locanis_English_2 .pdf.

(Continued)

*Primary Examiner* — Ryan Zeender
*Assistant Examiner* — Dana Amsdell
(74) *Attorney, Agent, or Firm* — Alston & Bird LLP

(57) ABSTRACT

System, methods, and computer program products are provided for enhanced freight tracking and monitoring. The system may track the location of a freight shipment within a carrier's transportation network from the time it is picked up by a carrier from a consignor until it is delivered to a consignee, provide for weight determinations and shipping re-classifications of the freight shipment during transport, and provide real-time status information and reports to the carrier, consignor, and/or consignee.

23 Claims, 20 Drawing Sheets

(51) Int. Cl.
*G01G 23/37* (2006.01)
*G01G 23/42* (2006.01)
*H04N 7/18* (2006.01)
*H04N 7/00* (2011.01)
*G01G 19/413* (2006.01)
*G06F 17/00* (2006.01)
*G08B 13/14* (2006.01)

(56) References Cited

U.S. PATENT DOCUMENTS

| | | | |
|---|---|---|---|
| 5,884,238 A * | 3/1999 | Noll | G01G 19/02 177/1 |
| 5,959,568 A | 9/1999 | Woolley | |
| 6,026,378 A | 2/2000 | Onozaki | |
| 6,148,291 A | 11/2000 | Radican | |
| 6,332,098 B2 * | 12/2001 | Ross et al. | 700/226 |
| 6,339,764 B1 * | 1/2002 | Livesay | G06Q 10/0875 705/28 |
| 6,539,360 B1 | 3/2003 | Kadaba | 705/28 |
| 6,974,928 B2 * | 12/2005 | Bloom | 209/583 |
| 6,983,883 B2 | 1/2006 | Ridling | |
| 7,012,529 B2 | 3/2006 | Sajkowski | |
| 7,027,808 B2 * | 4/2006 | Wesby | 455/419 |
| 7,344,037 B1 * | 3/2008 | Zakula et al. | 212/344 |
| 7,482,928 B2 * | 1/2009 | Brackmann et al. | 340/572.1 |
| 2002/0007291 A1 * | 1/2002 | Miller et al. | 705/5 |
| 2002/0007353 A1 * | 1/2002 | Kornacki | G06Q 10/04 705/400 |
| 2002/0030596 A1 * | 3/2002 | Finn | H04B 1/7183 340/572.1 |
| 2002/0070862 A1 | 6/2002 | Francis et al. | |
| 2002/0116273 A1 * | 8/2002 | Sundel | 705/19 |
| 2002/0188530 A1 | 12/2002 | Wojcik et al. | |
| 2003/0200111 A1 | 10/2003 | Damji | |
| 2004/0019471 A1 * | 1/2004 | Bush | B60P 1/00 703/6 |
| 2004/0148052 A1 | 7/2004 | Ferguson et al. | |
| 2004/0149823 A1 * | 8/2004 | Aptekar | 235/385 |
| 2004/0200644 A1 * | 10/2004 | Paine et al. | 177/136 |
| 2004/0215480 A1 | 10/2004 | Kadaba | |
| 2005/0119786 A1 * | 6/2005 | Kadaba | 700/224 |
| 2005/0149413 A1 | 7/2005 | Amling et al. | |
| 2005/0197844 A1 * | 9/2005 | Ng et al. | 705/1 |
| 2005/0216294 A1 | 9/2005 | Labow | |
| 2005/0226706 A1 * | 10/2005 | Thomas | B60P 1/38 414/467 |
| 2005/0284934 A1 | 12/2005 | Ernesti et al. | |
| 2006/0082590 A1 * | 4/2006 | Stevick et al. | 345/587 |
| 2006/0092003 A1 * | 5/2006 | Gardner | B60P 3/205 340/431 |
| 2006/0106742 A1 * | 5/2006 | Bochicchio | G01G 19/083 705/414 |
| 2006/0192652 A1 * | 8/2006 | Mandava et al. | 340/5.8 |
| 2006/0224355 A1 | 10/2006 | Morrison et al. | |
| 2006/0261164 A1 | 11/2006 | Bochicchio | |
| 2006/0282340 A1 * | 12/2006 | Morand et al. | 705/28 |
| 2007/0040677 A1 * | 2/2007 | Blair | G06Q 10/08 340/568.1 |
| 2007/0160449 A1 | 7/2007 | Girn et al. | |
| 2007/0210156 A1 * | 9/2007 | Bochicchio | G06Q 10/08 235/385 |
| 2007/0268138 A1 * | 11/2007 | Chung et al. | 340/572.1 |
| 2007/0294153 A1 | 12/2007 | DeRose et al. | |
| 2008/0126380 A1 * | 5/2008 | Lawe | 707/102 |
| 2008/0174485 A1 * | 7/2008 | Carani et al. | 342/357.07 |
| 2009/0059004 A1 * | 3/2009 | Bochicchio | B66F 9/0755 348/148 |
| 2009/0099897 A1 * | 4/2009 | Ehrman et al. | 705/9 |
| 2009/0216370 A1 | 8/2009 | Pandit et al. | |
| 2010/0213313 A1 * | 8/2010 | Reed | B64D 9/00 244/118.1 |

OTHER PUBLICATIONS

Office Action for U.S. Appl. No. 12/201,533 mailed Sep. 27, 2010.
Final Office Action for U.S. Appl. No. 12/201,533 mailed Jan. 28, 2011.
International Search Report and Written Opinion from International Application Serial No. PCT/US09/02522 mailed Feb. 3, 2011.
United States Patent and Trademark Office, Office Action for U.S. Appl. No. 13/421,941, dated Nov. 20, 2012, 15 pages, USA.
International Preliminary Examining Authority, Written Opinion for International Application No. PCT/US09/02522, mailed Feb. 3, 2011, 13 pages, United States Patent and Trademark Office, USA.
International Preliminary Examining Authority, International Preliminary Report on Patentability for International Application No. PCT/US09/02522, mailed May 18, 2011, 18 pages, United States Patent and Trademark Office, USA.
International Preliminary Examining Authority, *Corrected* International Preliminary Report on Patentability for International Application No. PCT/US09/02522, completed May 5, 2011, 16 pages, United States Patent and Trademark Office, USA.
United States Patent and Trademark Office, Office Action for U.S. Appl. No. 12/201,533, dated Aug. 31, 2012, 26 pages, USA.
Extended European Search Report for European Patent Application No. 09810334.4 Dated Nov. 16, 2011.
United States Patent and Trademark Office, Office Action for U.S. Appl. No. 12/201,533, dated Jan. 10, 2012, 29 pages, USA.
United States Patent and Trademark Office, Office Action for U.S. Appl. No. 13/421,941, dated Mar. 25, 2013, 14 pages, USA.
United States Patent and Trademark Office, Office Action for U.S. Appl. No. 13/729,410, dated Apr. 26, 2013, 9 pages, USA.
United States Patent and Trademark Office, Office Action for U.S. Appl. No. 12/421,941, Sep. 12, 2014, 20 pages, USA.
United States Patent and Trademark Office, Office Action for U.S. Appl. No. 12/201,533, Dec. 4, 2014, 26 pages, USA.
Canadian Intellectual Property Office, Requisition by the Examiner for Application No. 2,733,063, Mar. 26, 2014, 3 pages, Canada.
United States Patent and Trademark Office, Office Action for U.S. Appl. No. 13/421,941, Apr. 7, 2014, 16 pages, USA.
United States Patent and Trademark Office, Office Action for U.S. Appl. No. 13/729,410, Sep. 19, 2013, 16 pages, USA.
United States Patent and Trademark Office, Office Action for U.S. Appl. No. 13/421,941, Mar. 6, 2015, 20 pages, USA.
United States Patent and Trademark Office, Office Action for U.S. Appl. No. 13/729,410, Mar. 27, 2015, 17 pages, USA.
United States Patent and Trademark Office, Office Action for U.S. Appl. No. 12/201,533, Apr. 23, 2015, 30 pages, USA.
Canadian Intellectual Property Office, Requisition by the Examiner for Application No. 2,733,063, Apr. 15, 2015, 6 pages, Canada.
European Patent Office, Summons to Attend Oral Proceeding for Application No. 09810334.4, Jul. 24, 2015, 5 pages, Germany.
United States Patent and Trademark Office, Office Action for U.S. Appl. No. 13/729,410, Sep. 4, 2015, 18 pages, U.S.A.
United States Patent and Trademark Office, Office Action for U.S. Appl. No. 13/421,941, Dec. 31, 2015, 29 pages, USA.
United States Patent and Trademark Office, Office Action for U.S. Appl. No. 12/201,533, Feb. 19, 2016, 44 pages, USA.
State Intellectual Property Office of the P.R.C., Office Action for Application No. 200980133718.5, Dec. 10, 2015, 23 pages, China.
European Patent Office, Decision to Refuse a European Patent Application for Application No. 09810334.4, Apr. 29, 2016, 26 pages, Netherlands.
United States Patent and Trademark Office, Office Action for U.S. Appl. No. 13/729,410, Mar. 28, 2016, 24 pages, U.S.A.
United States Patent and Trademark Office, Office Action for U.S. Appl. No. 13/421,941, Jun. 20, 2016, 31 pages, U.S.A.
State Intellectual Property Office of the P.R.C., Re-Examination Decision for Application No. 200980133718.5, Jul. 25, 2016, 17 pages, China.
United States Patent and Trademark Office, Office Action for U.S. Appl. No. 13/729,410, Aug. 25, 2016, 26 pages, U.S.A.
United States Patent and Trademark Office, Office Action for U.S. Appl. No. 12/201,533, Jul. 28, 2016, 49 pages, U.S.A.

* cited by examiner

| PALLET | WEIGHT | STATUS | |
|---|---|---|---|
| PALLET 1 | 12345 | AaBb | REWEIGH |
| PALLET 2 | 12345 | AaBb | REWEIGH |
| PALLET 3 | 12345 | AaBb | REWEIGH |
| PALLET 4 | 12345 | AaBb | REWEIGH |

REWEIGH
PRO: 123456789
ID: 12345

SYSTEMS AND METHODS FOR FREIGHT TRACKING AND MONITORING

CROSS-REFERENCE TO RELATED APPLICATIONS

This application is a continuation of U.S. application Ser. No. 12/201,533, filed Aug. 29, 2008, which is hereby incorporated herein in its entirety by reference.

BACKGROUND OF THE INVENTION

The shipping industry is comprised of various types of shippers, including small package carriers, less-than-a-load ("LTL") carriers, and truck load carriers. Small package carriers usually transport packages or boxes from multiple consignors, while truck load carriers typically transport entire trailer loads from a single consignor. LTL carriers, on the other hand, generally transport freight that falls in between small packages and trailer loads. For example, LTL carriers may move freight from multiple consignees in a single trailer load, such as crates, scrap metal banded together, vehicle parts, pallets of boxes, drums, and the like. This freight is usually consolidated into a single trailer and transported through a carrier's transportation network. To track the freight and provide carrier personnel with routing and handling instructions, LTL carriers currently use paper bills of lading. The use of paper bills of lading decreases the efficiency and throughput of carrier transportation networks—relying almost solely on the efficiency of carrier employees—and does not provide for real-time visibility of freight progressing through a transportation network.

In addition to using paper bills of lading to track freight, LTL carriers often use the weight and shipping classifications on the bills of lading (provided by consignors) to appropriately charge consignors and/or consignees for transporting the freight. And although many carriers have internal audit mechanisms to verify the weight and shipping classifications provided on the bills of lading, the audit procedures are generally paper-driven and manual in nature. The paper-driven and manual nature of the current audit procedures limit the carriers' ability to efficiently and cost-effectively audit much of the freight they transport. For instance, carriers often have personnel who are specifically employed to audit freight shipments. Typically, the personnel manually verify the shipping classifications and weight provided on the bills of lading by personally inspecting the freight. This methodology usually enables carriers to only audit select freight shipments, leaving the majority of freight shipments unaudited and possibly incorrectly classified.

BRIEF SUMMARY OF VARIOUS EMBODIMENTS OF THE INVENTION

In general, embodiments of the present invention provide systems and methods for enhanced freight tracking and monitoring. In particular, freight shipments can be electronically tracked from receipt of the freight shipments from a consignor(s) through delivery of the freight shipments to a consignee(s). Moreover, during transport, the freight shipments can be inspected, classified, reweighed, re-classified, have their billing updated, and have their status provided to various entities while moving through a carrier's transportation network.

In accordance with one aspect, a system is provided for enhanced freight tracking and monitoring. In one embodiment, the system may include an enterprise system in electronic communication with a lift truck computing device, wherein the enterprise system includes one or more processors that may be configured to receive shipping data associated with a freight shipment, and wherein the shipping data includes a unique identifier assigned to the freight shipment and information corresponding to the destination of the freight shipment. In this embodiment, the enterprise system may also be configured to generate an electronic manifest, which includes at least a portion of the shipping data associated with the freight shipment, and electronically transmit the electronic manifest that includes at least a portion of the shipping data associated with the freight shipment. Moreover, the lift truck computing device includes one or more processors that may be configured to: receive the electronic manifest; cause display of at least a portion of the electronic manifest via a display; and receive input initiating a location event for the freight shipment, wherein the location event indicates the location of the freight shipment.

In accordance with another aspect, a system is provided, which, in one embodiment, may include a lift truck computing device disposed on a lift truck, the lift truck computing device comprising a memory, a display, and one or more processors; a reweigh computing device disposed on the lift truck; and an imaging device. In this embodiment, the lift truck computing device may be configured to receive an electronic manifest that includes at least a portion of shipping data associated with a freight shipment. The imaging device may be configured to capture one or more images of the freight shipment and electronically transmit the one or more images of the freight shipment to the lift truck computing device. And the reweigh computing device may be configured to determine a weight of at least a portion of the freight shipment and electronically transmit the weight determination to the lift truck computing device.

In accordance with yet another aspect, a computer-implemented method is provided, which, in one embodiment, may include: receiving, via an enterprise system, shipping data associated with a freight shipment, wherein the shipping data includes a unique identifier assigned to the freight shipment and information corresponding to the destination of the freight shipment; generating, via the enterprise system, an electronic manifest, wherein the electronic manifest includes at least a portion of the shipping data associated with the freight shipment; electronically transmitting, from the enterprise system, the electronic manifest that includes at least a portion of the shipping data associated with the freight shipment; receiving, via a lift truck computing device disposed on a lift truck, the electronic manifest; displaying, via a display disposed on the lift truck, at least a portion of the electronic manifest; and receiving, via the lift truck computing device, input initiating a location event for the freight shipment, wherein the location event indicates the location of the freight shipment.

According to another aspect, a computer-implemented method for enhanced freight tracking and monitoring is provided. In this embodiment, the method may include: receiving, via an enterprise system, an electronic manifest that includes at least a portion of shipping data associated with a freight shipment; capturing, via an imaging device, one or more images of the freight shipment; electronically transmitting, from the imaging device to a lift truck computing device disposed on a lift truck, the one or more images; determining, via a reweigh computing device disposed on the lift truck, a weight of at least a portion of the freight shipment; and electronically transmitting, from the reweigh computing device to the lift truck computing device, the weight determination of at least the portion of the freight shipment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 11-20 show universal input and output produced by one embodiment of the invention.

DETAILED DESCRIPTION OF VARIOUS EMBODIMENTS OF THE INVENTION

Figure 1:
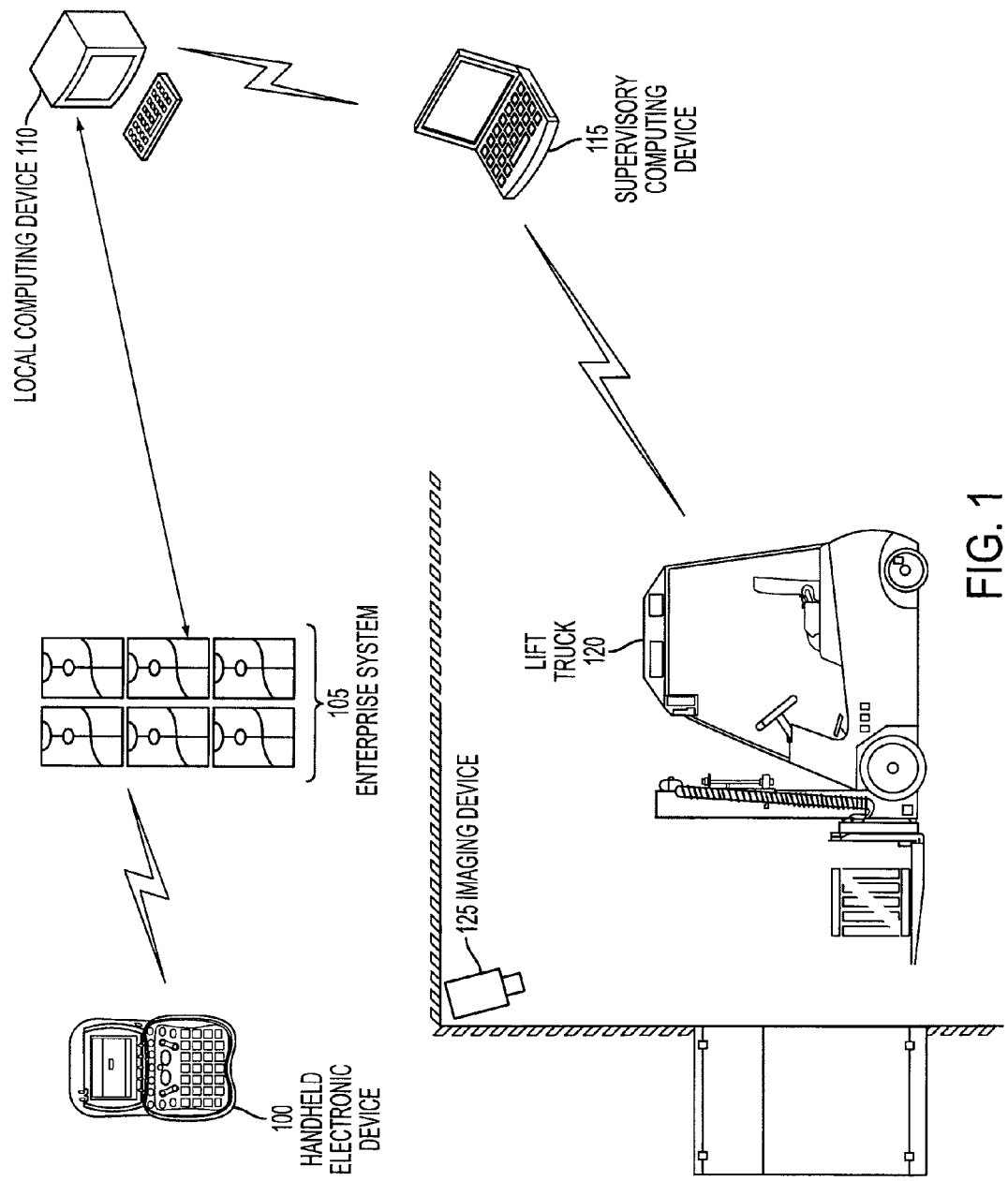
FIG. 1 shows an overview of one embodiment of a system that can be used to practice aspects of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Methods, Apparatus, Systems, and Computer Program Products

As should be appreciated, the embodiments may be implemented as methods, apparatus, systems, or computer program products. Accordingly, the embodiments may take the form of an entirely hardware embodiment, an entirely software embodiment, or an embodiment combining software and hardware aspects. Furthermore, the various implementations may take the form of a computer program product on a computer-readable storage medium having computer-readable program instructions (e.g., computer software) embodied in the storage medium. More particularly, implementations of the embodiments may take the form of web-implemented computer software. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer program products. It should be understood that each block of the block diagrams and flowchart illustrations, respectively, can be implemented by computer program instructions, e.g., as logical steps or operations. These computer program instructions may be loaded onto a general purpose computer, special purpose computer, or other programmable data processing apparatus to produce a machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

General Overview

In general, according to various embodiments of the present invention, methods, apparatus, systems, and computer program products are provided for enhanced freight tracking and monitoring. A system according to a particular embodiment may include a handheld electronic device, an enterprise system, a local computing device, a supervisory computing device, a lift truck computing device, a reweigh computing device, and an imaging device to provide for freight tracking and monitoring. For example, the handheld electronic device may receive information (e.g., shipping data) contained on a bill of lading when a freight shipment is picked up from a consignor. A unique identifier (e.g., a PRO number) may then be associated or assigned to the freight shipment, and a representation of the unique identifier may be physically attached to freight. After the handheld electronic device receives the information included on the bill of lading, it can transmit the information to the enterprise system.

The enterprise system can use the information provided by the handheld electronic device to plan the freight shipment's route through the carrier's transportation network. After the route is planned, the enterprise system may generate an electronic manifest, which may include the information from the bill of lading, the planned route, and handling instructions. The enterprise system may then transmit the electronic manifest to the local computing device and/or the supervisory computing device. One or both of these devices can be used to ultimately transmit the electronic manifest to the lift truck computing device.

Once the electronic manifest has been received by the lift truck computing device, the lift truck computing device may cause display the electronic manifest or at least a portion thereof via a display. At this point, the lift truck operator can select a freight shipment to transport. With the freight shipment selected for transport, the freight may then be identified and inspected. Information regarding the inspection of the freight (e.g., information regarding the condition of the freight referred to as "inspection data") may be received by the lift truck computing device as automated input or as manual input. The lift truck computing device may then determine if the inspection data exceeds an inspection threshold. If the inspection threshold (e.g., actual weight versus weight on the bill of lading) of the freight shipment is exceeded, the lift truck computing device may generate an inspection alert. Otherwise, the lift truck computing device may proceed with the reweigh process and the reweigh classification of the freight.

In the reweigh process, according to one embodiment, the freight is placed on the forks of the lift truck to determine, via the reweigh computing device, the weight of the freight shipment. Once completed, the reweigh computing device may transmit the weight determination to the lift truck computing device. In addition to receiving the weight determination, the lift truck computing device may also receive images of the freight shipment captured by the imaging device. For example, as the lift truck carrying the freight pulls out of a trailer, one or more imaging devices mounted above a strip door may take one or more images of the freight on the forks of the lift truck and transmit them to the lift truck computing device. Using the images captured by the imaging device, the lift truck computing device can determine the dimensions of the freight. With the dimensions and weight of the freight shipment, the lift truck computing device, in one embodiment, can determine the reweigh classification (e.g., the shipping classification at this reweigh process stage) based on the minimum average density in pounds per cubic foot. The lift truck computing device can then compare the reweigh classification to the billing classification (e.g., the shipping classification indicated on the bill of lading), and respond appropriately. For instance, if the reweigh classification and the billing classification are substantially the same, the transport process may proceed. Otherwise, the lift truck computing device may generate a classification alert and transmit the reweigh classification to the enterprise system, which in turn may update the billing classification for the freight shipment. Thus, in one embodiment, the enterprise system may update the billing classification to reflect the reweigh classification and charge the consignor or consignee accordingly.

After the freight shipment has been identified, inspected, reweighed, and/or the like, the freight shipment may be transported to the location (e.g., within the hub, another trailer, or the same trailer) indicated in the electronic manifest. Once the freight is transported to the correct location, the lift truck computing device can receive information identifying the location. The information identifying the location may be received as automated or manual input, e.g., as input entered by the lift truck operator or input received from barcode labels placed throughout a facility. Additionally, the lift truck computing device can receive a location validation confirming the location of the freight shipment.

During the entire transport process, the lift truck computing device may also receive telematics/parametric data about the lift truck, its movement, and/or the like. The lift truck computing device may even provide the above-described information to the enterprise system and the supervisory computing device as it received. This information can then be used to generate reports and provide real-time visibility of the information to the carrier, consignor, and/or consignee.

General System Architecture

FIG. 1 provides an illustration of one type of system that can be used in conjunction with various embodiments of the present invention. As shown in FIG. 1, the system may include a handheld electronic device 100 ("handheld"), an enterprise system 105, a local computing device 110, and a supervisory computing device 115. In general, the term "computing device" is used generically throughout to refer to any computer, mainframe, desktop, notebook or laptop, distributed system, server, gateway, switch, or other processing device configured to perform the functions described herein. Each of these components of the system may be in electronic communication with one another, a shipper, a consignee, or a consignor (e.g., with the aid of a personal computer ("PC"), laptop, or similar electronic device) over the same or different wireless or wired networks including, for example, a wired or wireless Personal Area Network ("PAN"), Local Area Network ("LAN"), Metropolitan Area Network ("MAN"), Wide Area Network ("WAN"), and/or the like. Additionally, while FIG. 1 illustrates the enterprise system 105, local computing device 110, and supervisory computing device 115 as separate, standalone entities, one of ordinary skill in the art will recognize that the various embodiments herein are not limited to this particular architecture. For example, the functionality of the enterprise system 105, the local computing device 110, and the supervisory computing device 115 may each occur on a single server, a mainframe computer system, multiple distributed or centralized servers, or similar computer systems or network entities.

Figure 5:
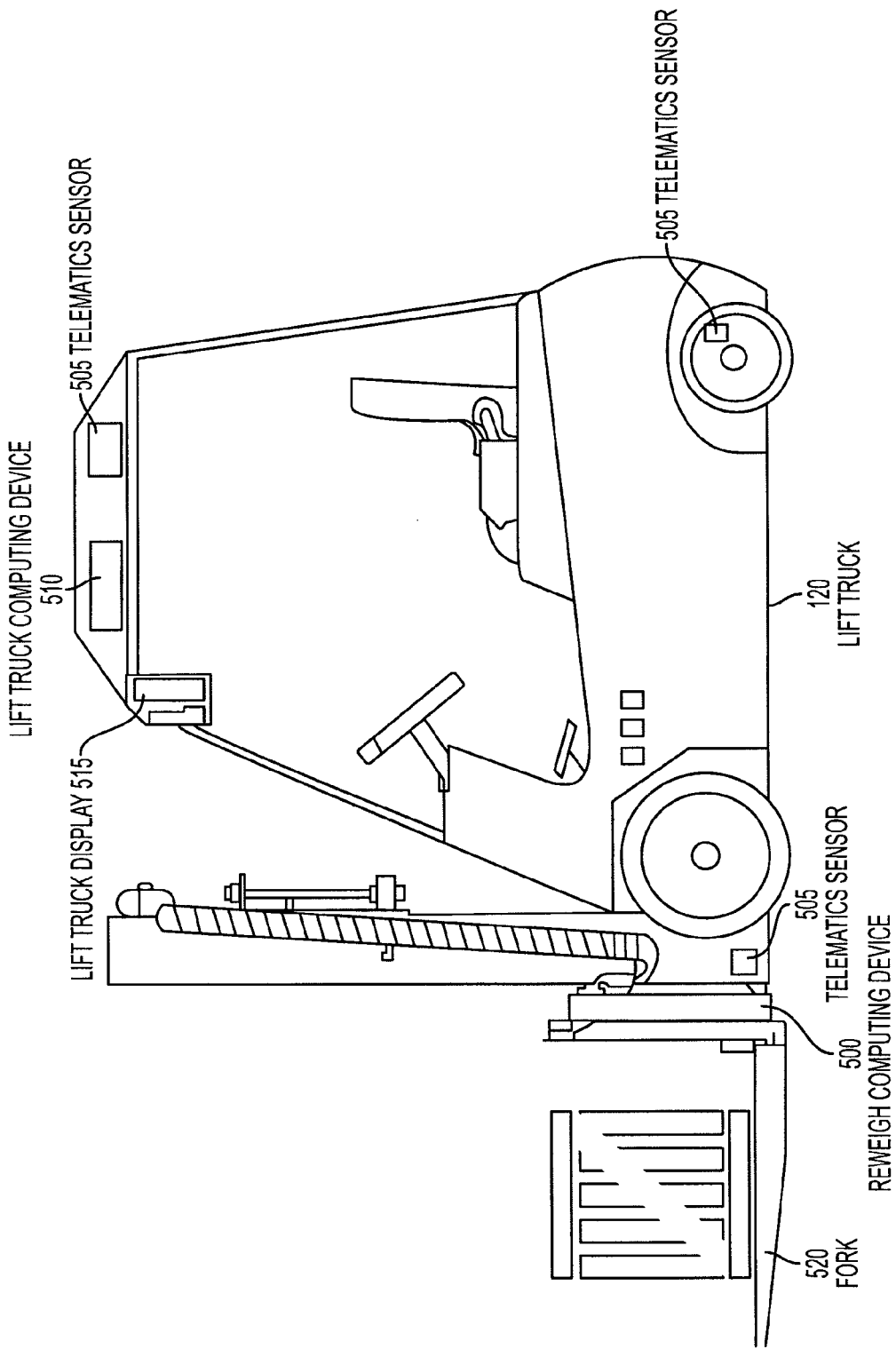
FIG. 5 shows an embodiment of a lift truck to that can be used to practice aspects of the present invention.

As also indicated in FIG. 1, the system may include a lift truck 120. The term "lift truck" is used generically to refer to any forklift, stacker truck, side loader, high/low, pallet truck, hand truck, handcart, stack truck, and/or the like that is capable of transporting freight. As discussed in greater detail below, and as shown in FIG. 5, the lift truck 120 may include a reweigh computing device 500, a lift truck computing device 510, and a lift truck display 515. These devices may be disposed on the lift truck 120 and be configured to perform various functions in the process of transporting freight and/or other items by a carrier from a consignor to a consignee through the carrier's transportation network. Also, although not shown, the reweigh computing device 500 and the lift truck computing device 510 (including the lift truck display 515) may be in electronic communication with one another, the handheld 100, the enterprise system 105, the local computing device 110, and the supervisory computing device 115 via the same or different wired or wireless networks. Moreover, although each device is shown as a separate, standalone entity, the functionality of some or all of the devices may be combined using a single computing device or distributed via multiple computing devices.

Finally, the system may also include an imaging device(s) 125. The imaging device 125 may be any analog or digital camera for capturing images of items, such as images of freight shipments and/or other items to determine their dimensions, e.g., height, length, width, or any combination thereof. The imaging device 125 may, for example, be mounted over a strip door or on a wall proximate a strip door. In one embodiment, the imaging device 125 captures digital images that can be electronically stored and communicated to various computing entities. And although not shown, the imaging device 125 may also be in electronic communication with the reweigh computing device 500, the lift truck computing device 510 (including the lift truck display 515), the handheld 100, the enterprise system 105, the local computing device 110, and the supervisory computing device 115 via the same or different wired or wireless networks.

Handheld Electronic Device

Figure 2:
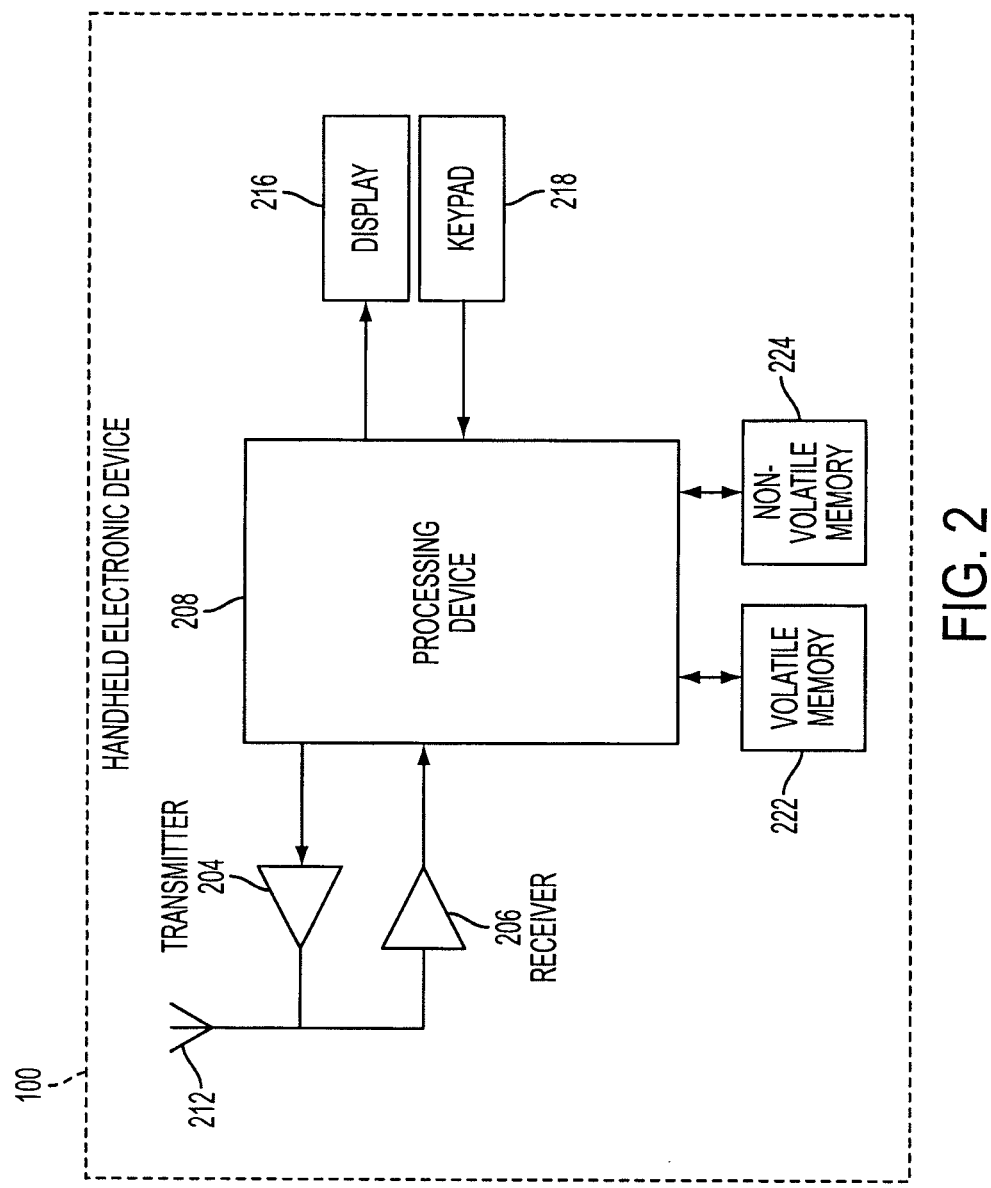
FIG. 2 shows a handheld computing device according to one embodiment of the invention.

FIG. 2 provides an illustrative schematic representative of a handheld 100 that can be used in conjunction with various embodiments of the present invention. The term "handheld" is used generically throughout to refer to any handheld electronic device, such as a pocket PC, delivery information acquisition device ("DIAD"), personal digital assistant ("PDA"), handheld computer, smartphone, portable media player, camera, laptop, pager, converged device, handheld game console, personal navigation device, and the like—including both wireless and wireline devices. As shown in FIG. 2, the handheld 100 may include an antenna 212, a transmitter 204, a receiver 206, and means, such as a processing device 208, e.g., a processor, controller, or the like, that provides signals to and receives signals from the transmitter 204 and receiver 206, respectively. The signals provided to and received from the transmitter 204 and the receiver 206, respectively, may include signaling information in accordance with an air interface standard of applicable wireless systems. In this regard, the handheld 100 may be capable of operating with one or more air interface standards, communication protocols, modulation types, and access types. More particularly, the handheld 100 may operate in accordance with any of a number of second-generation ("2G") communication protocols, third-generation ("3G") communication protocols, and/or the like. Further, for example, the handheld 100 may operate in accordance with any of a number of different wireless networking techniques, including Bluetooth, 802.11 ("Wi-Fi"), 802.16 ("WiMAX"), ultra wideband ("UWB"), and/or the like. Via these communication standards and protocols, the handheld 100 can communicate with the various entities shown in FIGS. 1 and 5. The handheld can also download changes, add-ons, and updates, for instance, to its firmware, software (e.g., including modules), and operating system.

The handheld 100 may also comprise a user interface (that can include a display 216 coupled to a processing device 208) and/or a user input interface (coupled to the processing device 208). The user input interface can comprise any of a number of devices allowing the handheld 100 to receive data, such as a keypad 218, a touch display (not shown), barcode reader (not shown), radio frequency identification ("RFID") tag interrogator (not shown), or other input device. In embodiments including a keypad 218, the keypad 218 can include the conventional numeric (0-9) and related keys (#, *), and other keys used for operating the handheld 100 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Although not shown, the handheld 100 may also include a battery, such as a vibrating battery pack, for powering the various circuits that are required to operate the handheld 100, as well as optionally providing mechanical vibration as a detectable output.

The handheld 100 can also include volatile memory 222 and/or non-volatile memory 224, which can be embedded and/or may be removable. For example, the non-volatile memory may be embedded or removable multimedia memory cards ("MMCs"), secure digital ("SD") memory cards, Memory Sticks, EEPROM, flash memory, hard disk, or the like. The memory can store any of a number of pieces or amount of information and data used by the handheld 100 to implement the functions of the handheld 100. For example, the volatile and non-volatile memory can be used to temporarily or permanently store input from the computing device and/or input entered by the user via the user input interface. The memory can also store content, such as computer program code for an application and/or other computer programs.

Enterprise System

Figure 3:
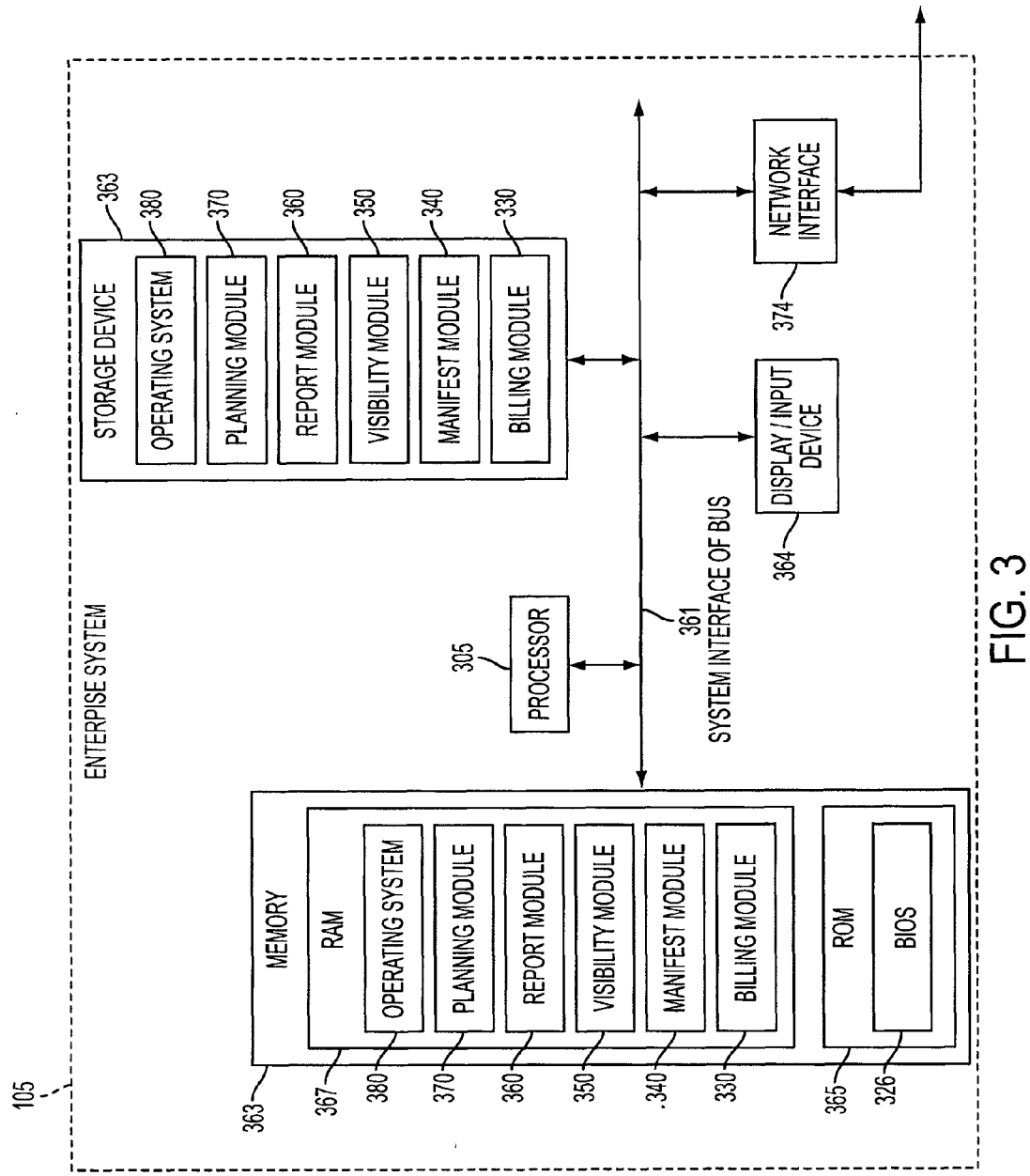
FIG. 3 shows an enterprise system according to one embodiment of the invention.

FIG. 3 provides a schematic of an enterprise system 105 according to one embodiment of the present invention. As will be understood from this figure, in this embodiment, the enterprise system 105 may include a processor 305 that communicates with other elements within the enterprise system 105 via a system interface or bus 361. A display device/input device 364 for receiving and displaying data may also be included in the enterprise system 105. This display device/input device 364 may be, for example, a keyboard or pointing device that is used in combination with a monitor. The enterprise system 105 may further include memory 366, which may include both read only memory ("ROM") 365 and random access memory ("RAM") 367. The server's ROM 365 may be used to store a basic input/output system (BIOS) 326 containing the basic routines that help to transfer information to the different elements within the enterprise system 105.

In addition, the enterprise system 105 may include at least one storage device 363, such as a hard disk drive, a CD drive, and/or optical disk drive, for storing information on various computer-readable media. The storage device(s) 363 and its associated computer-readable media may provide nonvolatile storage. The computer-readable media described above could be replaced by any other type of computer-readable media, for example, magnetic cassettes, flash memory cards, and digital video disks. As will be appreciated by one of ordinary skill in the art, each of these storage devices 363 may be connected to the system bus 361 by an appropriate interface.

Furthermore, a number of program modules may be stored by the various storage devices 363 and/or within RAM 367. Such program modules may include an operating system 380, a planning module 370, a report module 360, a visibility module 350, a manifest module 340, and a billing module 330. These modules may control certain aspects of the operation of the enterprise system 105 with the assistance of the processor 305 and operating system 250. For example, as discussed in more detail below with regard to FIGS. 7-10, according to one embodiment, the planning module 370 may generate shipping/routing plans (e.g., door and truck assignments) used in transporting freight shipments. Additionally, the manifest module 360 can generate electronic manifests, and the visibility module 350 can provide real-time visibility to the movement of freight in a carrier's transportation network. The billing module 330 may provide and update billing information for freight shipments before, during, and after shipment. And the report module 360 may generate reports relating to one or more freight shipments. In addition to the program modules, the enterprise system 105 may store one or more databases (not shown) with one or more tables therein. As will be recognized, the described architectures are provided for illustrative purposes only and are not limiting to the various embodiments. In this regard, although various program modules are described, the software need not be modularized.

Also located within the enterprise system 105 may be a network interface 374 for interfacing with the handheld 100, the local computing device 110, the supervisory computing device 115, the imaging device 125, the reweigh computing device 500, and the lift truck computing device 510. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the enterprise system 105 may be configured to communicate via wireless external communication networks using any of a variety of protocols, such as 802.11, general packet radio service ("GPRS"), wideband code division multiple access ("W-CDMA"), or any other wireless protocol.

Supervisory Computing Device

Figure 4:
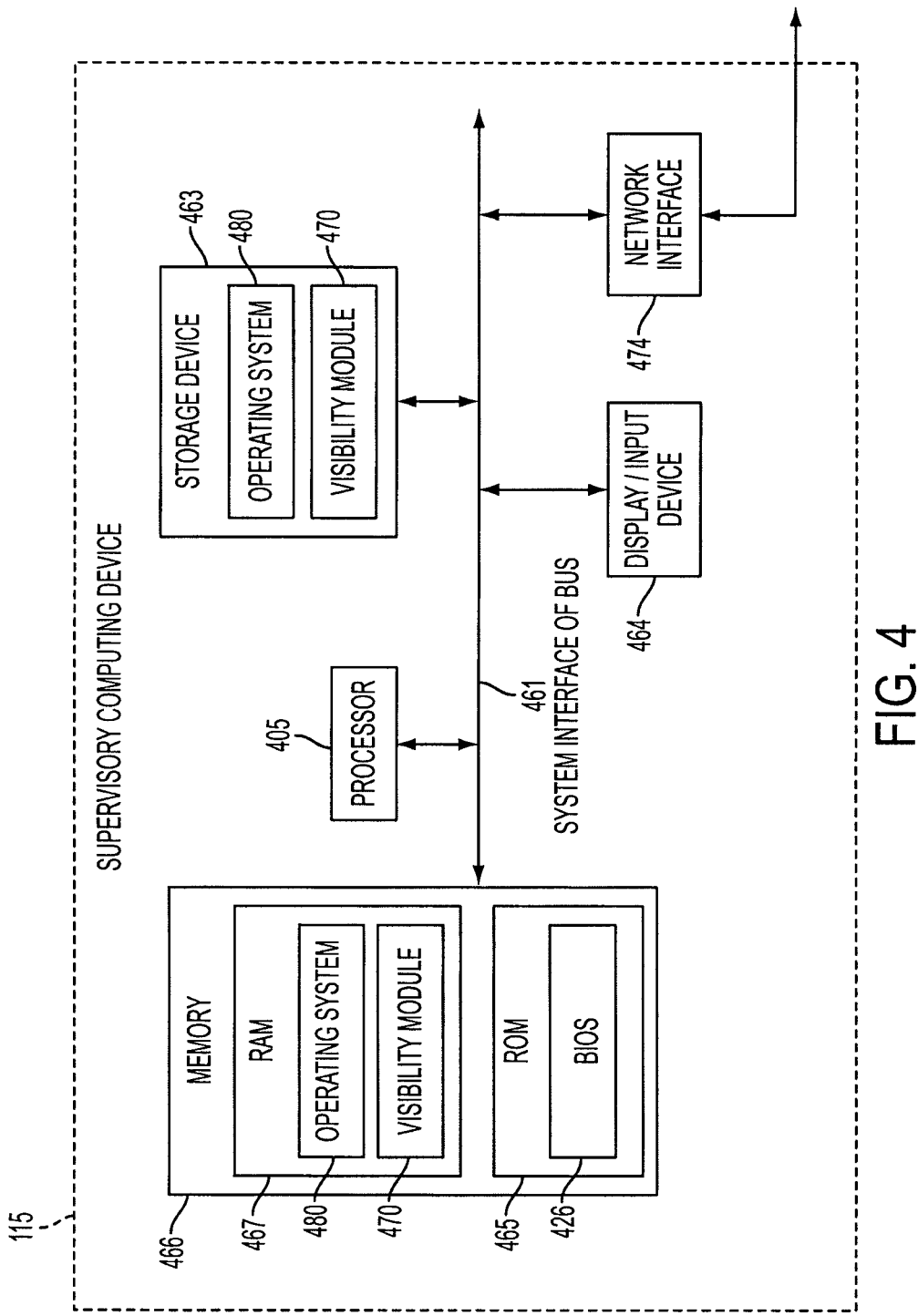
FIG. 4 shows a supervisory computing device according to one embodiment of the invention.

FIG. 4 shows a schematic diagram of a supervisory computing device 115 according to one embodiment of the invention. Similar to the enterprise system 105, the supervisory computing device 115 may include: (1) a processor 405 that communicates with other elements within the supervisory computing device 115 via a system interface or bus 461; (2) a display device/input device 464; (3) memory 466 including both ROM 465 and RAM 467; (4) a storage device 463; and (5) a network interface 474. The ROM 465 may store a BIOS 426, while the storage device 463 and/or RAM 467 may store an operating system 480 and a visibility module 470 for controlling certain aspects of the supervisory computing device 115 with the assistance of the processor 405. For instance, the visibility module 470 may provide real-time current status information for monitoring the movement of freight shipments and/or other items traveling through a carrier's transportation network. As will be appreciated by one of ordinary skill in the art, one or more of the supervisory computing device 115 components may be located geographically remotely from the other supervisory computing device 115 components. Furthermore, one or more of the components of supervisory computing device 115 may be combined within the enterprise system 105 or distributed via other systems or computing devices to perform the functions described herein. That is, the described architectures are provided for exemplary purposes only and are not limiting to the various embodiments. Thus, although various a program module is described, the software need not be modularized.

Lift Truck

Figure 6:
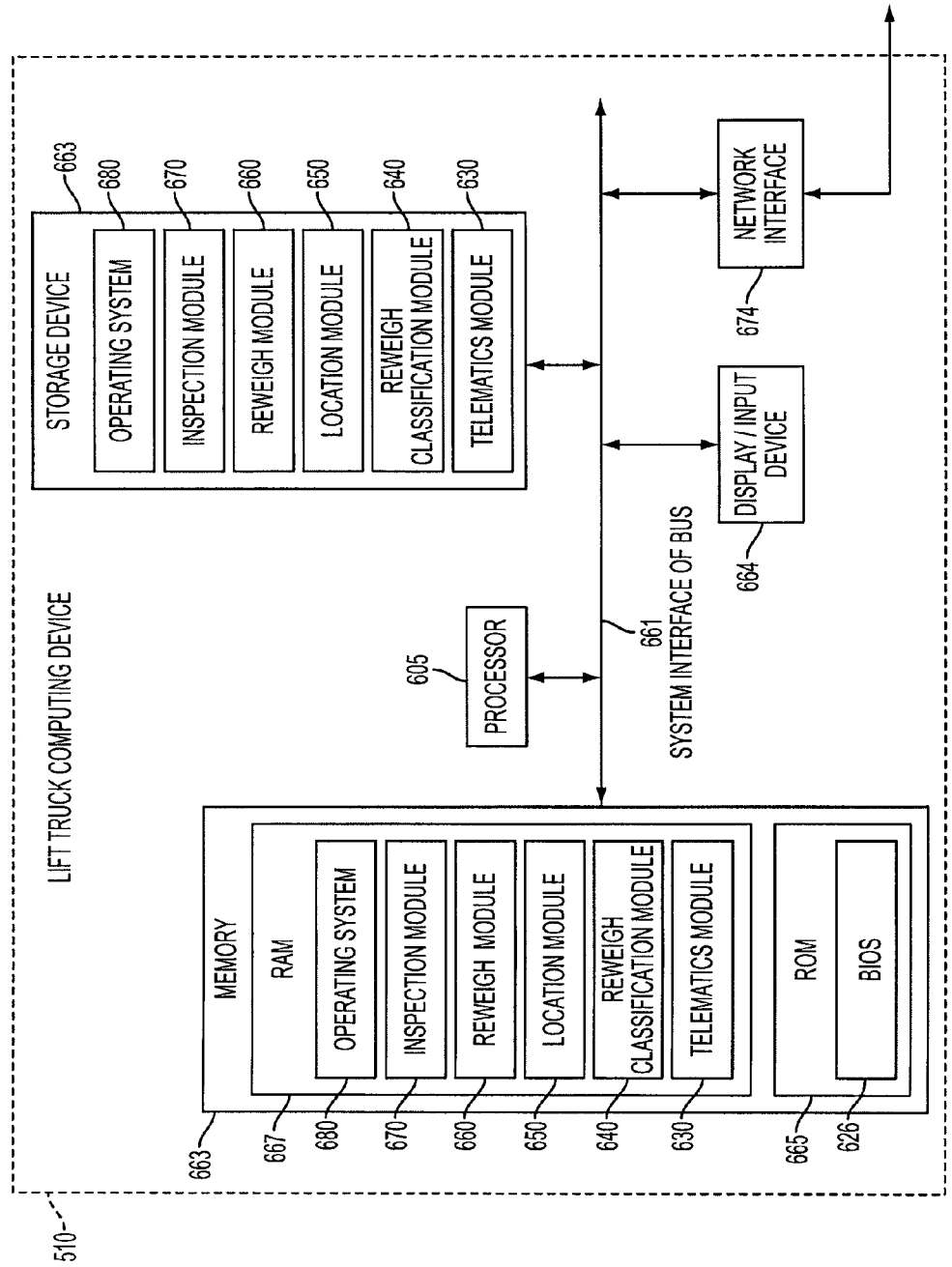
FIG. 6 shows a lift truck computing device according to one embodiment of the invention.

Finally, FIG. 5 shows a diagram of an illustrative lift truck 120 according to one embodiment. As mentioned, the lift truck 120 may include a reweigh computing device 500, one or more telematics sensors 505, a lift truck computing device 510, a lift truck display 515, and RFID tag interrogator and/or barcode readers (not shown). A schematic of the lift truck computing device 510 according to one embodiment is shown in FIG. 6. Similar to the enterprise system 105 and the supervisory computing device 115, the lift truck computing device 510 may include: (1) a processor 605 that communicates with other elements within the lift truck computing device 510 via a system interface or bus 661; (2) a display device/input device 664; (3) memory 663 including both ROM 665 and RAM 667; (4) a storage device 663; and (5) a network interface 674. The ROM 665 may store a BIOS 626, while the storage device 663 and/or RAM 667 may store an operating system 680, an inspection module 670, a location module 650, and a reweigh classification module 640, for controlling certain aspects of the lift truck computing device 510 (with the assistance of the processor 605). In particular, via these modules, the lift truck computing device 510 may provide information about freight shipments and/or other items traveling through a carrier's transportation network. For example, the information provided may include inspection data, information identifying freight locations, and reweigh classifications. In one embodiment, the inspection module 670 may provide inspection data regarding a freight shipment, and the location module 650 may provide information about the location of the freight shipment. As also shown in FIG. 6, the storage device 663 and/or RAM 667 may also store a reweigh module 660 and a telematics module 630. The reweigh module 660 may be used in conjunction with the reweigh computing device 500 to receive weight determinations of freight shipments or other items. For example, the reweigh computing device 500 can determine the weight of freight or other items placed on the fork 520 of the lift truck 120, and this determination may be sent to the lift truck computing device 510 (to the reweigh module 660). The reweigh classification module 640 may then use the weight determination to ensure that the freight shipment is properly classified based on its weight by determining a reweigh classification.

With respect to the telematics module 630, the lift truck computing device 510 may collect telematics/parametric data and transmit the telematics data to the enterprise system 105, the local computing device 110, and/or the supervisory computing device 115. For example, the lift truck computing device 510 may, with the aid of the processor 605 and the telematics module 630, receive telematics data from one or more telematics sensors disposed on the lift truck, such as variable voltage sensors, oil pressure sensors, seat sensors, seatbelt sensors, global positioning sensors ("GPS"), speed sensors, distance sensor, and the like. This telematics data can be manipulated and/or communicated to the other system entities described herein for various purposes, including evaluating operator efficiency and tracking the movement of freight shipments.

Also, as will be appreciated by one of ordinary skill in the art, one or more of the lift truck computing device 510 components may be located geographically remotely from the other lift truck computing device 510 components. Furthermore, one or more of the components of the lift truck computing device 510 may be combined within the enterprise system 105 or distributed via other systems or computing devices to perform the functions described herein. Similarly, the described architectures are provided for illustrative purposes only and are not limiting to the various embodiments. Therefore, although various program modules are described, the software need not be modularized.

The functionality, interaction, and operations executed by the systems and devices discussed above and shown in FIGS. 1-6, in accordance with various embodiments of the present invention, are described in the following sections.

General System Operation

Reference will now be made to FIGS. 7-20, which provide examples of operations and input and output produced by various embodiments of the present invention. In particular, FIGS. 7-10 provide flowcharts illustrating operations that may be performed to track freight shipments as they move through a carrier's transportation network and audit, for example, weight and classification information provided by consignees (or others). Some of these operations will be described in conjunction with FIGS. 11-20, which illustrate input and output that may be produced by carrying out the selected operations described in relation to FIGS. 7-10. The terms "freight" and "freight shipment" are used generically to refer to any item or items than can be transported by a carrier to a consignee. For example, freight or freight shipments may include small packages, scrap metal banded together, vehicle parts, boxes, crates, drums or boxes strapped to a pallet, and/or the like.

Before the process begins, in one embodiment, a driver for a carrier may be dispatched to pick up freight from a consignor. For example, a consignor may call a carrier, such as United Parcel Service of America, Inc. ("UPS®"), to have the carrier pick up a freight shipment to be transported by the carrier to a consignee. After the driver arrives at the location of the freight shipment, the driver may use a handheld 100 to scan an electronically readable portion (e.g., a barcode, MaxiCode, or text) of a bill of lading ("BOL") corresponding to the freight shipment. Alternatively, the handheld 100 receives information contained on the BOL as manual input from the driver. Generally, a BOL is a document that includes information about a freight shipment, such as the weight of the shipment, the number of pieces in the shipment, the contents of the shipment, the class of the shipment, the date the shipment is picked up from the consignor, the date the shipment is to be delivered to the consignee, consignee information (e.g., name and zip code of the consignee), regulatory information such as UN Numbers (e.g., four-digit numbers that identify hazardous substances and articles), or the like. The information on the BOL (or portions thereof) is generically referred to as "shipping data." Thus, as indicated in Block 700, by receiving information from the BOL as scanned input or manual input, the handheld 100 receives shipping data for the freight shipment.

In addition to or in combination with receiving the shipping data, the handheld 100 may associate or assign a unique identifier to the freight shipment, such as a progressive number ("PRO number"), a BOL number, a purchase order number, or a set of alphanumeric characters. The unique identifier (e.g., "123456789") can then be used by the carrier to identify and track the freight shipment as it moves through the carrier's transportation network. Such unique identifiers can be affixed to the freight shipment by, for example, using a sticker with the unique identifier printed thereon (in human and/or machine readable form) or an RFID tag with the unique identifier stored therein. In one embodiment, the unique identifier is associated with and affixed to each separable item being transported as the "freight shipment." So, for example, if the freight shipment included fifteen pallets, each pallet could be assigned the same unique identifier and have a corresponding sticker or RFID tag attached thereto (or attached to each item on the pallets). Alternatively, each of the fifteen pallets could be assigned a different unique identifier and have separate stickers or RFID tags attached to each of the pallets.

After the handheld 100 receives the shipping data, the handheld 100 may transmit the shipping data to the enterprise system 105 (Block 705). At this point, the enterprise system 105 can then receive the shipping data from the handheld 100 and plan the freight shipment's route through the carrier's transportation network (Blocks 710 and 715). The term "plan" is used generically to refer to routing the freight shipment to the consignee. This planning may include tasks such as assigning the freight shipment to a particular trailer for a given transportation segment, assigning the trailer that is to transport the freight to a specific door at the next hub facility for loading or stripping (i.e., unloading) the various freight shipments, and/or providing handling instructions to a lift truck operator(s). In one embodiment, the planning is performed by the planning module 370. Illustratively, if the freight were en route from Los Angeles to Orlando, the planning module 370 coordinates the door and/or trailer assignment at the next hub facility (or at each hub facility en route to Orlando) to ensure that the freight shipment is loaded onto the correct trailer. Thus, if all freight shipments leaving Los Angeles en route to Florida are being loaded out of door "82" into trailer "A12," the planning module 370 would establish a route using door 82 to load the freight shipment into trailer A12.

Once the freight shipment is processed through the appropriate outbound door and loaded into the correct trailer, for example, the freight shipment can then be logically "linked" to the trailer. Thus, if freight shipment 123456789 is loaded into trailer A12 through outbound door 82 (at a Los Angeles hub), freight shipment 123456789 can be logically linked to trailer A12 for purposes of tracking the progress of the freight shipment as it moves through the carrier's transportation network. During its transport through the carrier's network, the freight shipment might be linked (and unlinked) to trailers, planes, hub facilities, precise locations within a hub facility, delivery trucks, and/or the like.

In planning routes, the planning module 370 may contemplate various factors to maximize the efficiency and throughput of the carrier's transportation network. For example, arbitrarily assigning a strip (or unloading) door at a given hub facility could potentially decrease the freight throughput of the hub and delay the stripping and loading of other trailers. For instance, in the Phoenix hub, if stripping the freight shipments of trailer A12 via door "S13" would increase the distance the freight shipments would need to be transported at the hub, it would likely increase the strip time of trailer A12 and delay other hub functions such as the reloading of trailer A12. In isolation, such a delay may seem trivial. However, when repeated, such delays may significantly alter the efficiency of the carrier's transportation network. To minimize these situations, the planning module 370, in determining a route, may calculate the total cross-hub distance that using a particular strip door would require. For instance, by multiplying the total number of units in each freight shipment by the travel distance from a given strip door to the required outbound door for each freight shipment, the planning module 370 can determine the total cross-hub distance for a freight shipment and/or trailer load. By minimizing the cross-hub distance, hub efficiency may be increased. In addition to the minimizing the cross-hub distance, the planning module 370 may also evaluate other factors to increase efficiency in the transportation network, such as the weight capacity of a lift truck, whether a freight shipment will be temporarily housed at the hub facility, and load priority of a shipment (e.g., if a shipment has a guaranteed delivery date).

As indicated in Block 720, after the shipping data is received and the route is planned, the manifest module 340 may generate an electronic manifest. The term "electronic manifest" is used generically to refer to a list of freight linked to, for example, a carrier transport means such as a trailer or plane. In addition to a list of the freight linked to a particular transport means, the electronic manifest may also include both the shipping data (e.g., information regarding the freight shipment on the BOL) and routing information provided by the planning module 370 for each freight shipment included in the electronic manifest. In one embodiment, the electronic manifest provides this information (e.g., list of the freight, shipping data, and routing information) for all shipments located within the transport means. In another embodiment, the electronic manifest provides this information for a single freight shipment having multiple units located in the transport means. In various embodiments, the electronic manifest may be assigned a manifest identifier such that each manifest can be tracked or otherwise identified. Thus, the electronic manifest can be used to both track the movement of freight and provide instructions for handling and/or routing the freight through the carrier's transportation network.

The electronic manifest may be used by various carrier personnel such as lift truck operators (or others) at a hub facility (or other locations) to route the freight through the transportation network. For example, lift truck operators at a hub facility may use the electronic manifest (via a lift truck computing device 510) to strip the freight from one trailer and load it into another trailer, temporarily house the freight at the hub facility, or leave the freight in the trailer.

In one embodiment, for the lift truck computing device 510 to receive an electronic manifest, the electronic manifest may first be sent to various other computing devices. In transmitting the electronic manifest, in one embodiment, the enterprise system 105 may transmit it using two separate files. For example, according to one embodiment, the electronic manifest can be sent using a first message file and a second message file. The first message file may include information relating to freight located within a transport means, e.g., all shipments located within a trailer and their routing and/or handling instructions. The second message file may include the shipping data (or at least a portion thereof) associated with the freight of the first message file and any associated "special handling instructions," such as information on handling hazardous materials in a freight shipment. As will be recognized, the message files are illustrative and are not limiting to the various embodiments described herein. Thus, in another contemplated embodiment, the electronic manifest may be a single message file or multiple message files, which are transmitted to various computing devices.

Figure 7:
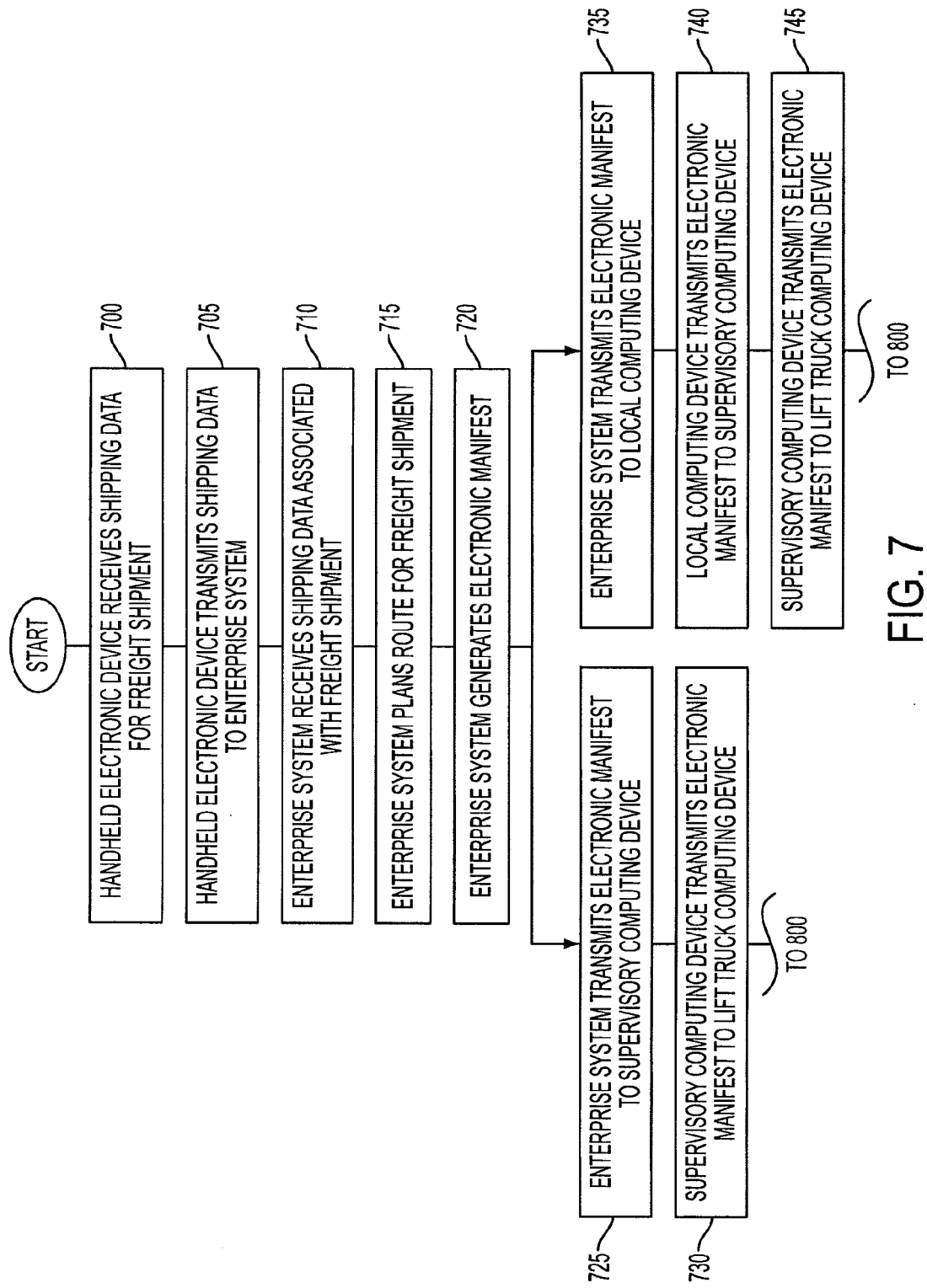
FIGS. 7-10 are flowcharts illustrating operations and processes that can be used in accordance with various embodiments of the present invention.
Figure 8:
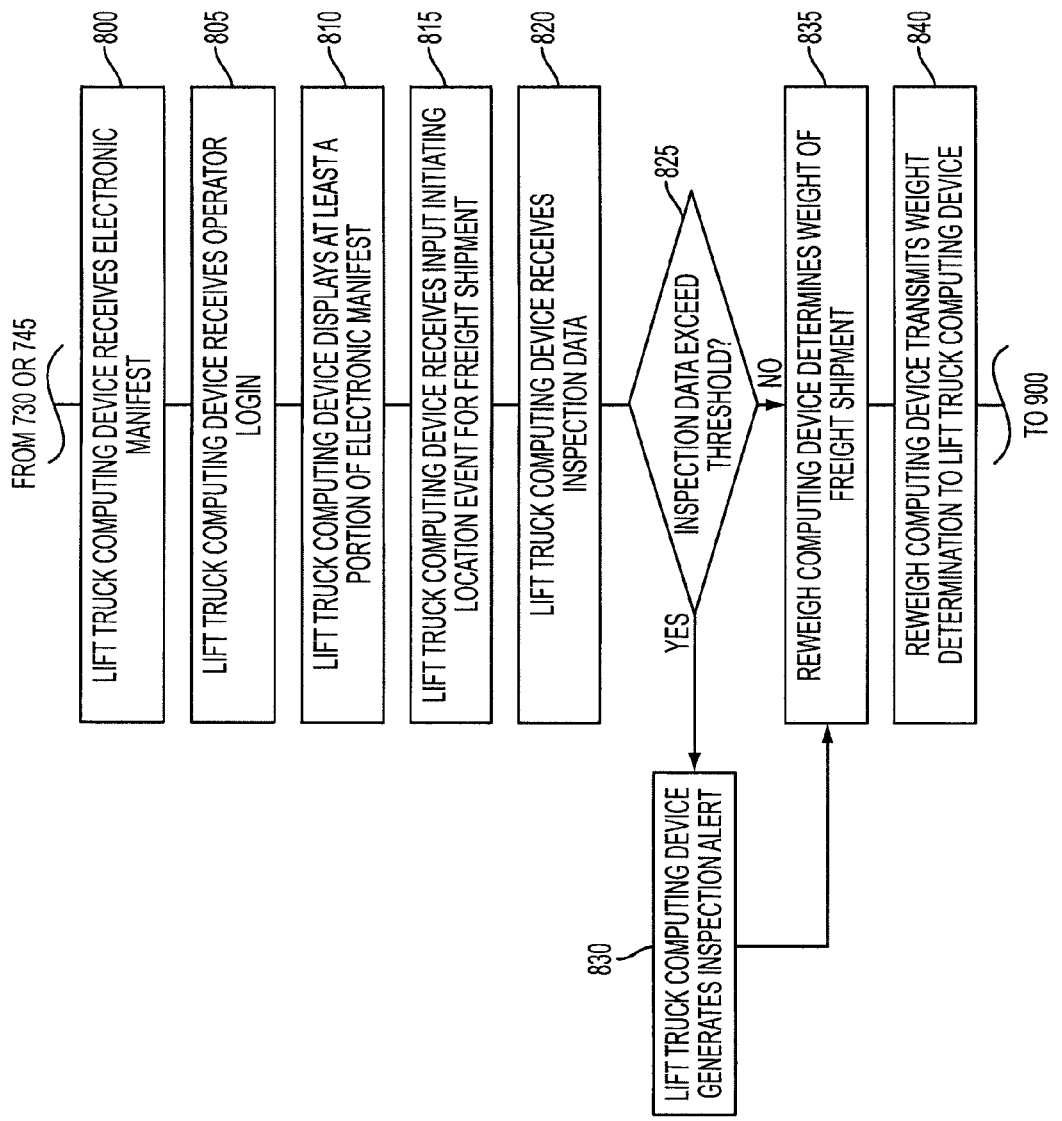
Figure 9:
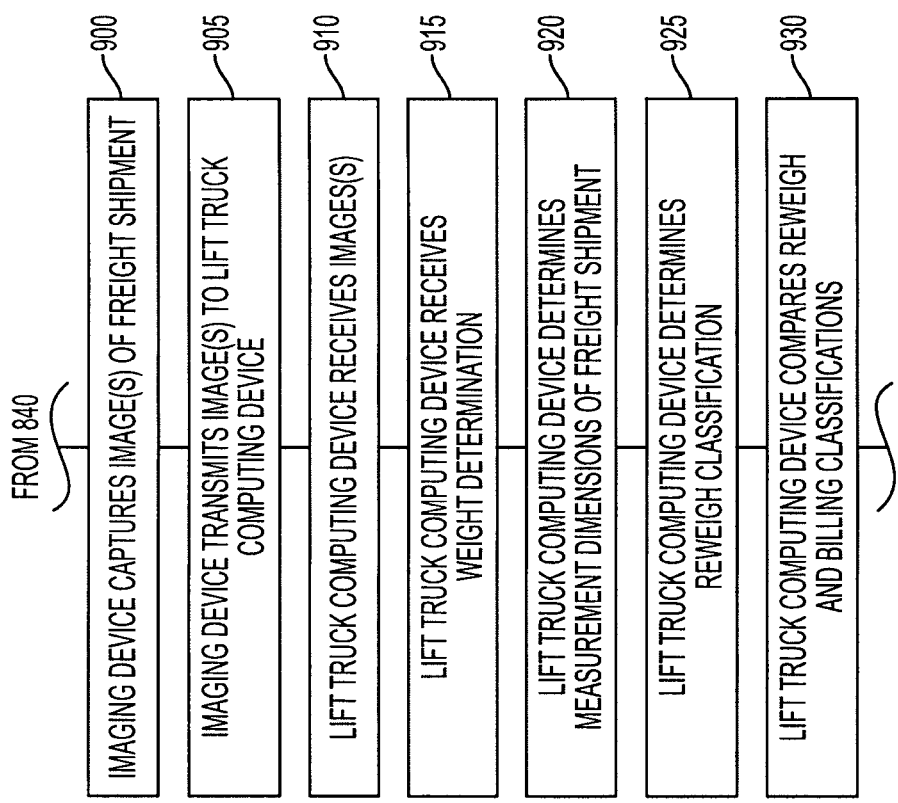
Figure 10:
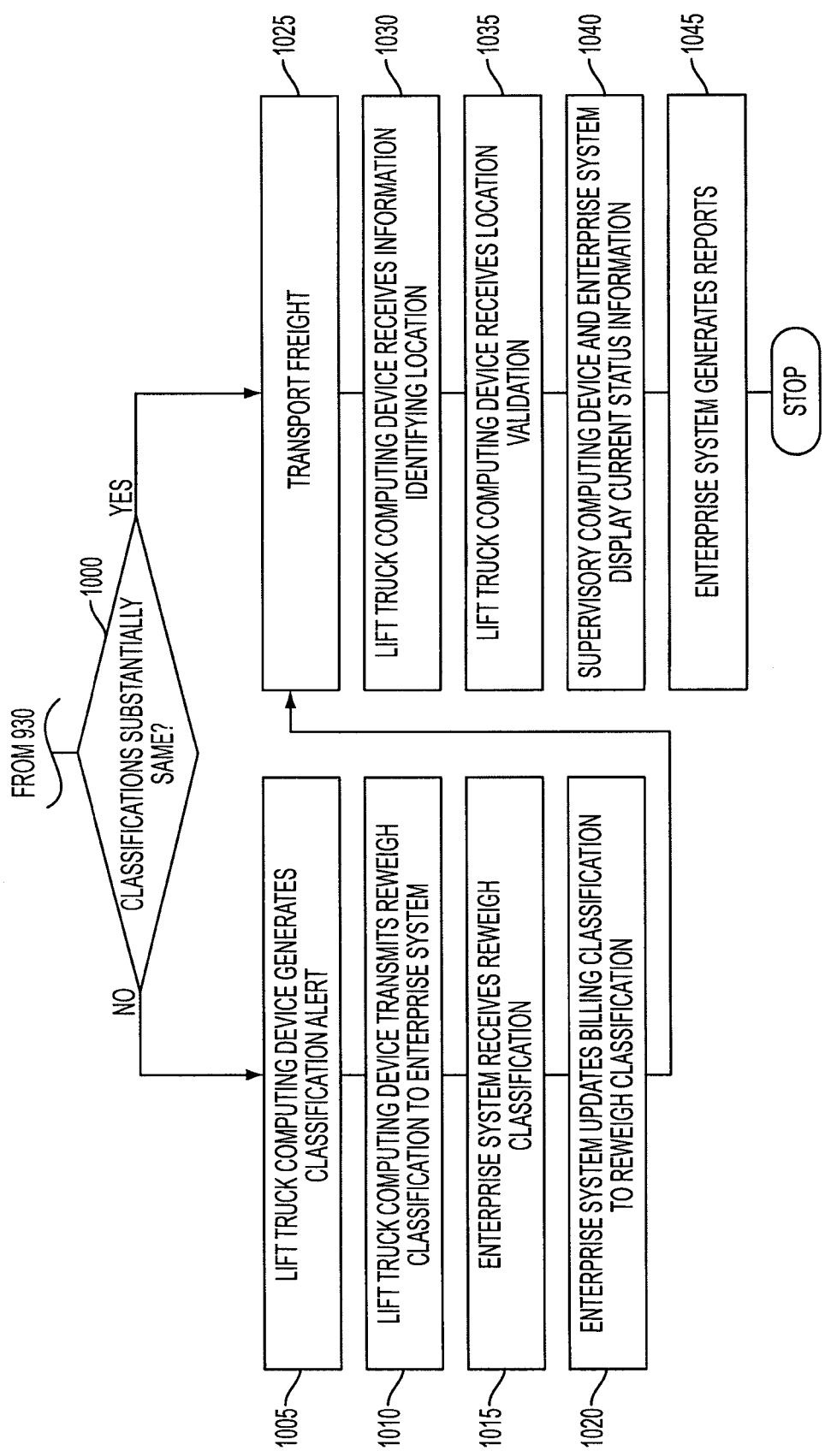

As shown in FIG. 7 and indicated above, the electronic manifest may first be sent to and received by various other computing devices before being sent to and received by the lift truck computing device 510. For example, as shown in Block 725, the enterprise system 105 may transmit the electronic manifest to a supervisory computing device 115, after which the supervisory computing device 115 may transmit the electronic manifest to the lift truck computing device 510 (Block 730). In another embodiment, the enterprise system 105 may transmit the electronic manifest to a local computing device 110 (Block 735), the local computing device 110 may then transmit the electronic manifest to the supervisory computing device 115 (Block 740), after which the supervisory computing device 115 may transmit the electronic manifest to the lift truck computing device 510 (Block 745). In these contemplated embodiments, transmitting the electronic manifest to the various computing devices may serve different functions.

With respect to the local computing device 110, in one embodiment, the local computing device 110 may function as a gateway or central location to receive information for a region, general area, or hub. For example, in one embodiment, for all shipments being transported to or through the greater Atlanta area, a single location could serve as the central communications point for all hubs within the Atlanta area. In another embodiment, the local computing device 110 could serve a managerial function at a specific hub, such as coordinating the freight flow at the hub by assigning the various electronic manifests to the supervisory computing devices 115. This architecture may facilitate network redundancy or managerial functions, including monitoring the flow of freight through various hubs.

With respect to the supervisory computing device 115, in one embodiment, the supervisory computing device 115 may be used to coordinate various functions within a hub facility. For example, in one embodiment, the supervisory computing device 115 may be located within a hub facility that houses one or more lift trucks 120. In this embodiment, the supervisory computing device 115 may assign or dispatch work to the lift truck operators, e.g., instructions to strip or load trailers (or other transport means). For example, if there are ten lift trucks 120 at a hub facility and ten inbound trailers en route to the hub that will need to be stripped, the supervisory computing device 115 may assign each lift truck 120 to strip a particular trailer. In assigning a lift truck 120 to strip, for example, a particular trailer, the supervisory computing device 115 may transmit one or more electronic manifests linked to the trailer to the assigned lift truck computing device 510 (Blocks 730 and 745). After the lift truck computing device 510 receives the electronic manifest (Block 800), a copy of the electronic manifest (including a list of all freight within a trailer, the shipping data associated with the freight in the trailer, and handling/routing instructions for the freight) can be stored in the lift truck computing device 510 and used to transport freight shipments. Further, as will be recognized, in the contemplated embodiments, there may be multiple supervisory computing devices 115 at a single location. For example, there may be five supervisory computing devices 115 at a hub used by carrier personnel to coordinate the flow of freight through the hub.

Figure 11:
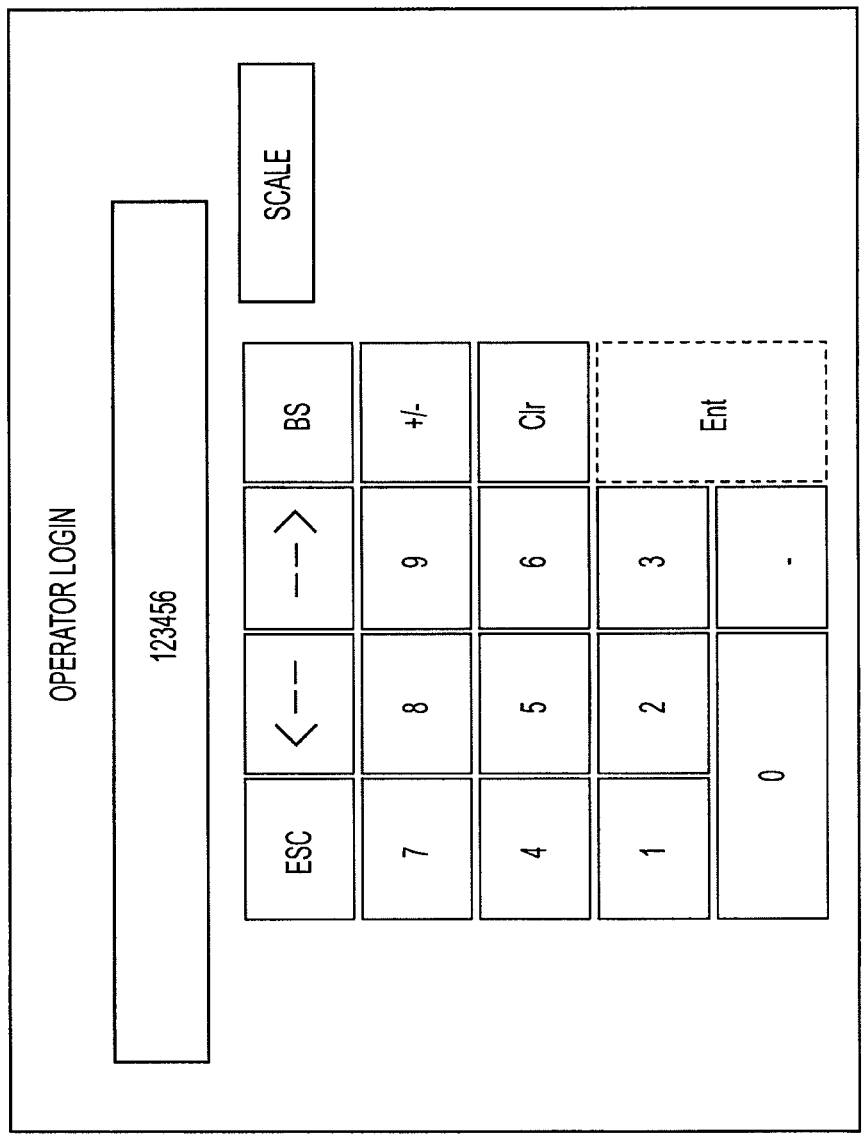

However, in one embodiment, before operation of the lift truck 120 can begin, the lift truck computing device 510 may receive a lift truck operator's login (Block 805). The operator login may be received before, during, or after receipt of the electronic manifest. An illustrative operator login screen displayed via a lift truck display 515 is shown in FIG. 11. Using the lift truck computing device 510, the lift truck operator can validate his credentials (e.g., authorization) to operate the lift truck 120. Thus, at this step, the lift truck computing device 510 receives the lift truck operator's login and verifies that the operator is authorized to operate the lift truck 120.

After the operator's identity has been verified, the lift truck computing device 510 may cause display the electronic manifest or at least a portion thereof (Block 810). Continuing with the above example, as shown in FIG. 12, the lift truck computing device 510 can display five of the twelve freight shipments (or any other number) included in the electronic manifest. In this embodiment, the lift truck computing device 510 displays the unique identifier for the freight shipment (e.g., the PRO number), the strip door for the trailer, the manifest identifier, the consignee, the destination, and other information. At this point, the lift truck operator can select a freight shipment to initiate a location event. The term "location event" is used generically to indicate that information regarding the location of the freight shipment may be received as input by the lift truck computing device 510. Thus, a location event does not necessarily connote that the freight is being moved, but that information regarding its location may be received as input, such as indicating that the freight shipment has arrived at a particular hub and will remain with the assigned trailer.

After the lift truck computing device 510 receives the operator input initiating a location event for a particular freight shipment (Block 815), the lift truck operator may identify the freight shipment in the trailer (or other transport means). To identify the freight shipment, various techniques may be used. For example, the lift truck operator may simply perform a visual inspection of the freight, e.g., by reading a sticker affixed to the freight shipment with the corresponding unique identifier printed thereon. Alternatively, to identify the freight, the lift truck 120 may be equipped with a barcode reader and/or an RFID tag interrogator on the fork 520, for instance, that can be used to scan the barcode stickers or interrogate the RFID tags attached to the freight. By scanning the barcode or interrogating the RFID tag, the unique identifier can be automatically determined by the lift truck computing device 510.

In an alternative embodiment, before initiating a location event for a particular freight shipment, the freight shipment may be automatically identified using an RFID tag interrogator. For example, after the lift truck computing device 510 displays at least a portion of the electronic manifest, the lift truck operator may use the lift truck 120 to pick up the first available freight shipment. In this embodiment, after the freight shipment is picked up by the fork 520 of the lift truck 120 (or even before), the freight can be automatically identified by interrogating the RFID tag attached to the freight using the RFID interrogator. Accordingly, the lift truck computing device 510 can automatically identify freight and initiate a location event for the identified freight. Thus, as illustrated, identifying the freight can be automated with minimal or no human involvement. As will be recognized, various other techniques may be used to identify freight shipments and be within the scope of the various embodiments of the present invention.

In yet another embodiment, a freight shipment that is not included in the electronic manifest may be identified in, for example, a trailer. In such cases, the freight shipment can be added to the electronic manifest via the lift truck computing device 510. For instance, the lift truck operator can input (or scan) the unique identifier of the freight shipment via the lift truck computing device 510, which may respond with a handling instruction provided by the supervisory computing device 115. In this way, the lift truck computing device 510 can provide instructions for "unexpected" events and add freight shipments to an electronic manifest.

Figure 13:
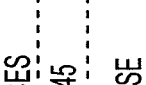

After a location event is initiated, the freight may be inspected and the lift truck computing device 510 may receive inspection data as input (Block 820). The term "inspection data" is used generically to refer to information identifying the condition of the freight, such as overages, shortages, damage, and/or the like. As shown in FIG. 13, as part of the inspection process, the lift truck computing device 510 can display detailed information about the freight shipment for which the location event was initiated. For example, the lift truck computing device 510 may display the number of loose units, hand units, and pallet units in the freight shipment. In one embodiment, the term "loose units" refers to freight units that can be placed on pallets, but that are being transported as loose, individual pieces. Similarly, "hand units" can be used to refer to oversized or bulky items that may be difficult to move during the stripping or loading process, e.g., scrap metal banded together. And "pallet units" may refer to freight that is being transported on pallets. With this detailed information being displayed, the lift truck operator can use the information to inspect the condition of the freight and input the inspection data into the lift truck computing device 510.

Continuing with the above example, if a consignor ships forty boxes that are shrink-wrapped on a single pallet, the shipping data and electronic manifest can indicate that the freight shipment comprises a single pallet with forty boxes attached thereto. So, for instance, if a location event is initiated for this freight shipment, a screen similar to that shown in FIG. 13 may be displayed via the lift truck display 515. Using the information provided by the lift truck computing device 510 via the lift truck display 515, the lift truck operator can inspect the freight to determine if there are any overages, shortages, or damage that may have occurred during transit. After completing the inspection, according to one embodiment, the lift truck computing device 510 receives the results of the inspection, e.g., the lift truck computing device 510 receives the inspection data as input from the lift truck operator (Block 820). In another embodiment, the lift truck computing device 510, via the inspection module 670, receives inspection data automatically from a computing device, such as a reweigh computing device 500 (Block 820). For example, the inspection data may simply be a weight determined by the reweigh computing device 500 and transmitted to the lift truck computing device 510 as inspection data. In this embodiment, the "inspection" may merely comprise weighing the freight and comparing the weight to the information provided in the BOL to determine if there is a weight disparity in the freight shipment since the time transport commenced, e.g., a possible overage or shortage of freight or incorrect weight provided on the BOL.

After the lift truck computing device 510, via the inspection module 670, receives the inspection data (e.g., as automated or manual input), the lift truck computing device 510 may determine if the inspection data exceeds an inspection threshold. An "inspection threshold" may be, for instance, a definable amount of freight overage, freight shortage, or freight damage that is acceptable for a given freight shipment, a set of freight shipments, or for all freight shipments. Thus, there may be multiple inspection thresholds for a shipment, a set of shipments, or for all shipments. For example, in one embodiment, three inspection thresholds may be defined: an overage threshold; a shortage threshold; and a damage threshold. In an alternative embodiment, a single threshold is defined. In the above example, the inspection threshold may indicate that any freight overage, a 2% percent freight shortage, and 8% freight damage are all satisfactory thresholds for all freight shipments. Correspondingly, in this embodiment, any shortage exceeding 2% and any damage exceeding 8% would exceed the inspection threshold. As will be recognized, the inspection threshold can be a percentage, a number, a condition (e.g., water damage), a weight, and/or the like. Moreover, in various embodiments, the inspection thresholds may be variably defined by the consignor, consignee, or carrier. For example, if a consignor ships a high-value item, any damage to the freight may be unacceptable and the damage threshold may be set at 0%. In contrast, if the consignor ships a low-value item, a certain percentage of damage may not significantly affect the value of the freight and the damage threshold may be higher, such as 15%.

Continuing with the above example, if the pallet shipped with forty shrink-wrapped boxes received significant damage to twenty-five of the forty boxes, the lift truck operator could inspect the freight and input the inspection data (e.g., condition information) representative of the damage via the lift truck computing device 510. After receiving the inspection data, the lift truck computing device 510 may determine if the inspection data exceeds one or more inspection thresholds (Block 825). If the lift truck computing device 510 determines that the inspection data exceeds an inspection threshold, in one embodiment, it may generate an inspection alert (Block 830).

As indicated above, the term "inspection alert" is used generically to indicate some form of notification that an inspection threshold has been exceeded. Inspection alerts may be generated by the lift truck computing device 510 (or another computing device) in a variety of ways. For example, the lift truck computing device 510 may send a textual notice to a computer, pager, cell phone, DIAD, or other mobile device. Similarly, the lift truck computing device 510, via the inspection module 670, may simply set an electronic flag (e.g., changing a defined bit in a message) that can be transmitted to the enterprise system 105, the local computing device 110, the supervisory computing device 115, or the like. As will be recognized, the described inspection alerts are illustrative and not limiting to the various embodiments of the present invention, and, in fact, may be generated by devices other than the lift truck computing device 510.

Additionally, the range of uses of the inspection alerts may vary. In one embodiment, an inspection alert may simply notify the carrier that damage to a particular freight shipment has occurred. In this embodiment, the carrier may determine whether further action is necessary based on its relationship with the consignor or consignee. In another embodiment, the inspection alert may provide the consignor or consignee with the option of intervening with the progress of the freight shipment. For example, the consignor may request that the freight shipment be returned or that delivery of the freight shipment to the consignee continue. So, for instance, as noted in the above example, if an inspection alert were generated because twenty-five of the forty boxes were damaged, the consignor may request that the entire damaged freight shipment be returned (or routed to another location), and the consignor may immediately ship a new freight shipment to the consignee.

With respect to charging customers for transporting a freight shipment, carriers may rely on the shipping classification provided by the consignor on the BOL (in addition to, for example, internal auditing procedures). The shipping classification may be based on a number of factors, including the value, potential for damage, overall weight, and pounds per cubic foot of the freight shipment. Of these, the two predominant factors in determining a shipping classification are the weight and dimensions of the freight. Because the lift truck 120, in one embodiment, includes a reweigh computing device 500, weights for freight shipments can be determined at hub facilities (and other locations) to help ensure that shipping classifications on the BOLs are accurate. If a shipping classification is inaccurate, the carrier may undercharge or overcharge the consignor for transporting the freight. With respect to undercharges, a significant percentage of freight that is transported by carriers is at least initially under-classified, which may cause the carriers lose a substantial amount of revenue if undetected. For example, one estimate indicates that a large freight carrier may recover as much as $30 million a year by manually auditing the shipping classifications of just a small percentage of the freight shipments it transports. With an automated system automatically auditing every, or most, freight shipments, it is likely that such revenue recoveries would increase substantially. To audit the shipping classification of a freight shipment, it may be useful to determine the dimensions and weight of the freight shipment.

Figure 15:
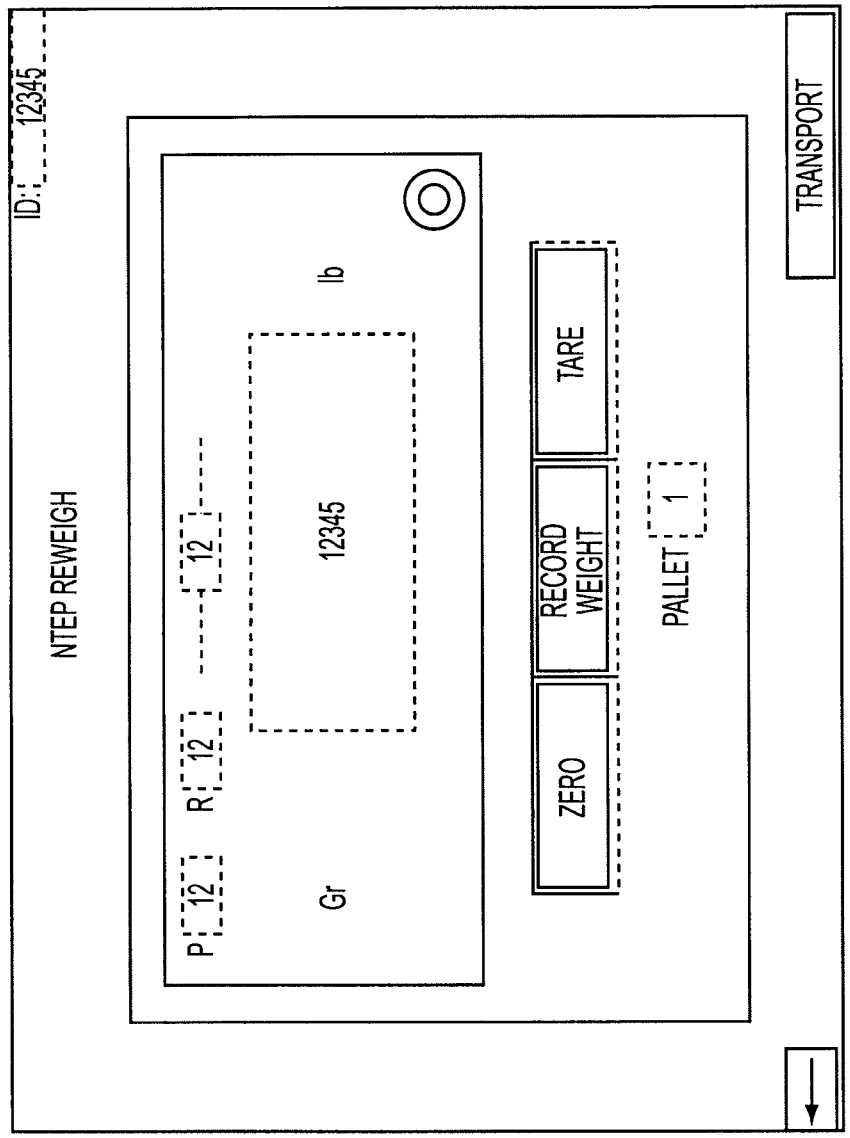

To make weight determinations, in addition to housing the reweigh computing device 500, the lift truck 120 may include a "load cell" and an "inclinometer" on the lift truck 120. For example, in one embodiment, the lift truck 120 may include a load cell(s) mounted to one (or both) of the forks 520. In this embodiment, the load cell is capable of determining the weight of items on the fork 520. Similarly, an inclinometer(s) may be mounted to one (or both) of the forks 520 to monitor lift truck tilts, slope measurements, and/or pitch and roll measurements that may affect weight determinations. In operation, the load cells can provide the measurement of weight on the forks 520 and the inclinometer can determine the angle (forward angles, backward angles, and lateral angles) of the forks 520. Thus, for the reweigh computing device 500 to make a weight determination, it may receive weight and angle information from the load cell(s) and inclinometer(s), respectively. After receiving this information, the reweigh computing device 500, compensating for angles and the like, may make a weight determination for the freight on the fork(s) 520 (FIGS. 14-15 and Block 835). Then, the reweigh computing device 500 may transmit the weight determination to the lift truck computing device 510 (Block 840). As will be recognized, though, the lift truck computing device 510 may also receive the weight determination as manual input from a user, e.g., as an override input or as input for freight that does not lend itself to weight determinations using the fork 520 or the lift truck 120.

In addition to ensuring accurate freight classifications, as discussed above, weight determinations (e.g., reweighing the freight at different locations in the transportation network) may also be used to determine whether there is an overage or shortage of freight that occurred during transit. Thus, the weight determination can be received as the inspection data (or as part of the inspection data) for comparing to the inspection threshold.

These weight determinations may, according to one embodiment, be made on every freight shipment transported by a carrier. In another embodiment, making a weight determination on every freight shipment may prove infeasible. Thus, in certain circumstances, only the freight shipments of specific consignors may be subject to reweighs (and reweigh classifications), e.g., based on a particular consignor's course of business conduct. For example, if a consignor frequently under-classifies shipments, the carrier may find it necessary to reweigh all of the consignor's shipments. Similarly, particular types of shipments may be difficult to classify (e.g., scrap metal banded together), so the carrier may find it necessary to reweigh particular types of shipments or all shipments of particular classifications regardless of the consignor or the type of freight being shipped.

As will be recognized, according to various embodiments, the weight determinations may be in compliance with and may be made using devices certified by the National Type Evaluation Program ("NTEP"). An official NTEP certificate of conformance is issued by the National Conference on Weights and Measures ("NCWM") following successful completion of the evaluation and testing of a device. The certification indicates that the device meets applicable requirements for commercial weighing and measuring equipment in the United States. Thus, for example, the reweigh computing device 500 may be an NTEP certified device, allowing a carrier to weigh freight shipments and charge customers in compliance with applicable legal requirements. Similarly, outside of the United States, the weight determinations and devices may be operated and certified in compliance and accordance with an applicable governing jurisdiction's regulations and laws.

As discussed above, the two predominant factors in determining shipping classifications are the weight and dimensions of the freight. To aid in determining freight dimensions (e.g., height, length, width, or any combination thereof), one embodiment of the system includes two imaging devices 125, such as two digital cameras mounted proximate a strip door. In this embodiment, the two imaging devices 125 can be used to capture multiple views and images of the freight. Providing multiple views and images of the freight may be helpful in determining the dimensions of the freight, providing for more accurate measurements or compensating for obstructed (or otherwise unclear) views of the freight. In this embodiment, the imaging devices 125 may capture one or more images of the freight on the fork 520 of the lift truck 120 (Block 900). For example, as the lift truck 120 drives out of the trailer, the imaging devices 125 may capture multiple images of the freight located on its fork(s) 520. After an imaging device 125 captures one or more images, it may transmit them to the lift truck computing device 510 (Block 905).

As indicated in Blocks 910 and 915, the lift truck computing device 510 may receive both the weight determination from the reweigh computing device 500 (or as manual input) and the images from the imaging devices 125. Using the images from the imaging devices 125, the lift truck computing device 510 may calculate the dimensions (e.g., height, length, width, or any combination thereof) of the freight (Block 920). For instance, using algorithms, the lift truck computing device 510 may determine the length, width, and/or height of the freight shipment based, for instance, on the pixels in the digital images received from the imaging devices 125. As an example, because digital images are represented by pixels (or image dots), algorithms can analyze the pixels of an image to identify "edges" of surfaces of an object. Using the identified edges, algorithms may use a fixed object or other reference in the image to determine its dimensions. For instance, by using a reference point, such as a twelve inch long barcode affixed to a freight shipment, algorithms can determine the number of pixels required for a length of twelve inches. With this information, algorithms can then determine the dimensions, such as length, width, and/or height, of the freight shipment.

In an another embodiment, lasers can be used to determine (or help determine) the dimensions of a freight shipment. For example, a distance laser can be mounted near a strip door to determine the highest point of a freight shipment to determine (or help determine) its height. In this embodiment, images received from the imaging devices 125 can still be used to determine the length and width of the freight shipment. Similarly, as will be recognized, lasers can also be used to determine (or help determine) the height, width, and length of a freight shipment. In yet another alternative embodiment, as will also be recognized, the dimensions may be received as manual input or be received as part of the shipping data.

After the lift truck computing device 510 determines the dimensions of the freight shipment, it can determine the shipping classification based on the weight determination and the dimensions (Block 925). In one embodiment, this classification is referred to as the "reweigh classification." The term "reweigh classification" is used because the weight determination may take place after an initial weight determination has been made either by the consignor or the carrier.

Similar to the NTEP certification for weight determinations, the reweigh classification may be determined in compliance and accordance with applicable regulations and laws. In the United States, the National Motor Freight Traffic Association, Inc., has established National Motor Freight Classification ("NMFC") standards for providing a comparison of freight moving in interstate, intrastate, and foreign commerce. For example, freight may be classified into one of eighteen classes—from a low of class 50 to a high of class 500. For example, the lift truck computing device 510, via the reweigh classification module 640, may determine the proper shipping classification in accordance with the NMFC standards based on the minimum average density in pounds per cubic foot. Table 1 is provided below to illustrate exemplary average densities, shipping classifications, and average values per pound.

TABLE 1

| Minimum Average Density (in pounds per cubic foot) | Shipping Classification | Average Value Per Pound |
|---|---|---|
| 50 | 50 | $1.06 |
| 35 | 55 | $2.06 |
| 30 | 60 | $3.12 |
| 22.5 | 65 | $5.17 |
| 15 | 70 | $7.80 |
| 13.5 | 77.5 | $10.39 |
| 12 | 85 | $15.61 |
| 10.5 | 92.5 | $20.78 |
| 9 | 100 | $25.99 |
| 8 | 110 | $28.60 |
| 7 | 125 | $32.49 |
| 6 | 150 | $39.02 |
| 5 | 175 | $45.52 |
| 4 | 200 | $52.02 |
| 3 | 250 | $65.02 |
| 2 | 300 | $78.01 |
| 1 | 400 | $104.02 |
| Less than 1 | 500 | $130.04 |

In addition to weight and dimensions, the density, stowability, handling, and liability of the freight may also be considered to evaluate freight classifications. All of this information may be stored in tables stored in the lift truck computing device 510 to determine freight reweigh classifications via the reweigh classification module 640. Alternatively or additionally, such tables may be stored in various other computing devices, such as the enterprise system 105, and accessed by the lift truck computing device 510 to make reweigh classifications. Thus, by using weight determinations made by NTEP certified devices and reweigh classifications determined in accordance with NMFC guidelines, carriers can charge customers for the reweigh classifications determined in accordance and compliance with applicable regulations and laws. Similarly, outside of the United States, the devices and reweigh classifications may be in accordance and compliance with an applicable governing jurisdiction's requirements.

As indicated in Block 930, after determining the reweigh classification, the lift truck computing device 510 may compare the reweigh classification to the billing classification (e.g., the classification provided by the consignee on the BOL or as determined by the carrier upon receipt of the freight shipment). The reweigh classification and the billing classification can be compared to determine if they are "substantially similar" (Block 1000). The term "substantially similar" is used to mean an exact classification match and/or to mean a reasonable classification discrepancy as defined by the carrier, consignor, or consignee. In one embodiment, by determining if the classifications are substantially similar, the carrier may, if desired, allow for expected or reasonable classification discrepancies. For instance, to maintain a valued relationship with a consignor, a carrier may choose to allow for classification discrepancies under a certain value, e.g., $5.62, for a particular consignor. Similarly, classification discrepancies may be allowed for international freight shipments that may be associated with different shipping classifications for each country. For example, class 70 in the U.S. may be class 50 in Mexico, which may mean that the classifications are substantially similar. As indicated above, though, the carrier may require that all billing classifications match the reweigh classifications and not allow for any classification discrepancies. Thus, the term "substantially similarly" may be variably defined by the carrier, consignor, or consignee and may be a monetary value, a percentage, and/or the like. Also, as will be recognized, the substantial similarity comparison can be made by the enterprise system 105, the local computing device 110, or the supervisory computing device 115.

If the lift truck computing device 510 determines that the reweigh classification and the billing classification are not substantially the same, it may generate a classification alert (Block 1005). As with the inspection alert, the term "classification alert" is used generically to indicate some form of notification that the billing classification and the reweigh classification are not substantially the same. Classification alerts may be generated by the lift truck computing device 510 (or another computing device) in a variety of ways. For example, the lift truck computing device 510 may send a textual notice to a computer, pager, cell phone, DIAD, or other mobile device. Similarly, the lift truck computing device 510 may simply set an electronic flag (e.g., changing a defined bit in a message) that can be transmitted to the enterprise system 105, the local computing device 110, the supervisory computing device 115, or the like. As will be recognized, the described classification alerts are illustrative and not limiting to the various embodiments of the present invention, and, in fact, may be generated by entities other than the lift truck computing device 510.

The classification alerts may be used for different purposes. In one embodiment, classification alerts may be used to notify the lift truck operator that the reweigh classification needs to be verified as being correct before proceeding. For instance, the classification alert may require the lift truck operator to verify the dimensions of the freight and/or the weight determination to ensure their accuracy before updating the billing classification. In another embodiment, classification alerts may be used to randomly check reweigh classifications in an effort to monitor the overall performance and accuracy of the system.

In Block 1010, the lift truck computing device 510 may then transmit the reweigh classification to the enterprise system 105. After the enterprise system 105 receives the reweigh classification, it may change/update the billing classification, via the billing module 330, to reflect the correct billing classification as indicated by the reweigh classification (Blocks 1015 and 1020). By updating the billing classification, carriers can appropriately charge consignors and/or consignees for the correct shipping classification. Thus, if the freight is under-classified, the responsible party may be charged an additional amount (in one embodiment, the additional amount may further include a service charge). If the freight is over-classified, the responsible party may receive a credit from the carrier.

Figure 16:
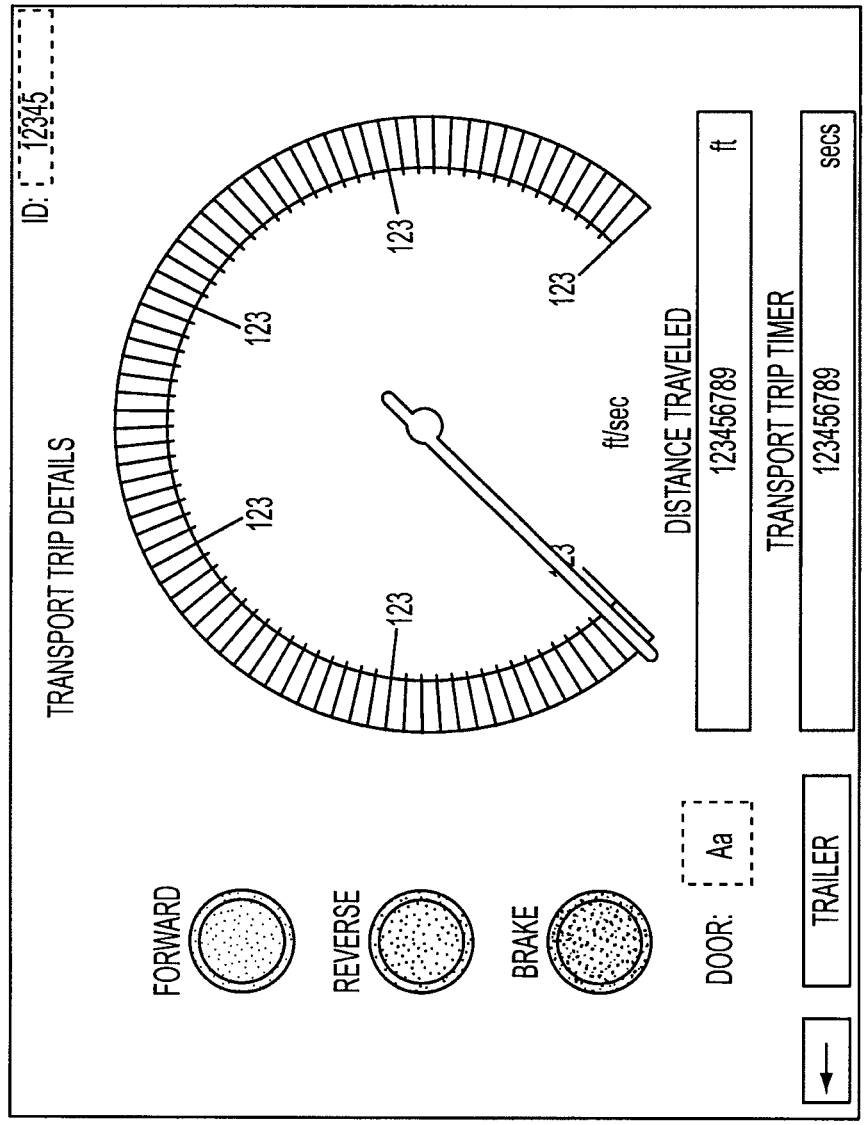

After the freight shipment has been identified, inspected, reweighed, and the like, the freight shipment may be transported to the location indicated via the electronic manifest (Block 1025). As shown in FIG. 16, during transport, a transitional screen may be displayed to show information about the transport of the freight, e.g., speed, direction, and the like. In one embodiment, to provide this information, the lift truck computing device 510 may receive telematics/parametric data via the telematics module 630. For example, the lift truck computing device 510 may receive telematics data from various sensors, such as variable voltage sensors, oil pressure sensors, seat sensors, seatbelt sensors, speed sensors, distance sensors, and the like. The data received from these sensors can be manipulated and/or communicated to the other system entities described herein for various purposes, including evaluating operator efficiency and tracking the movement of freight shipments. For instance, lift truck operator efficiency can be tracked by monitoring how long it takes to strip a trailer or how long it takes to transport a freight shipment across the hub. Similarly, the data may be used, for example, to determine when lift truck 120 maintenance such as an oil change is necessary. Table 2 provides illustrative telematics data that can be received via the telematics module 630.

TABLE 2

| Name | Telematics/Parametric Data |
| --- | --- |
| DriverRunTimer | The time the operator has been running the lift truck |
| DriverRunMiles | The number of feet the operator has driven the lift truck (day, month, or year) |
| IdentificationTimer, | Number of seconds required to identify freight shipment |
| InspectionTimer, | Number of seconds required to identify freight shipment and reweigh freight |
| MoveTimer, | Number of seconds required to transport freight shipment |
| LoadTimer | Number of seconds required to load freight shipment |
| ReturnTripTimer, | Number of seconds required to return to stripping location |
| MoveFeet | Total feet per move. |
| BeginLocation | Strip door or dock zone, e.g., |
| EndLocation | Coded value for final location within trailer (see below) |
| EndtrailerID | Final trailer Number |

As well the above telematics data, the lift tuck computing device 510 may receive location data from a GPS, RFID tags, and/or barcodes. For example, as the lift truck 120 moves throughout the hub, RFID tags (and/or barcodes) storing location information can be interrogated (read) to automatically determine the location of the lift truck 120. For instance, as the lift truck 120 turns a corner or passes a particular location in a hub, an RFID tag affixed to the particular corner or location may be automatically interrogated to identify the location of the lift truck 120. In addition to using such mechanisms in hubs, similar identification means may be used to identify trailers, trucks, planes, and other transport means. For example, the rear door or interior of a trailer may have an RFID tag attached thereto to identify the trailer and/or the current location of the trailer. The location information may be used to track to the movement and efficiency of the lift truck 120 and/or the location of the freight.

Figure 17:
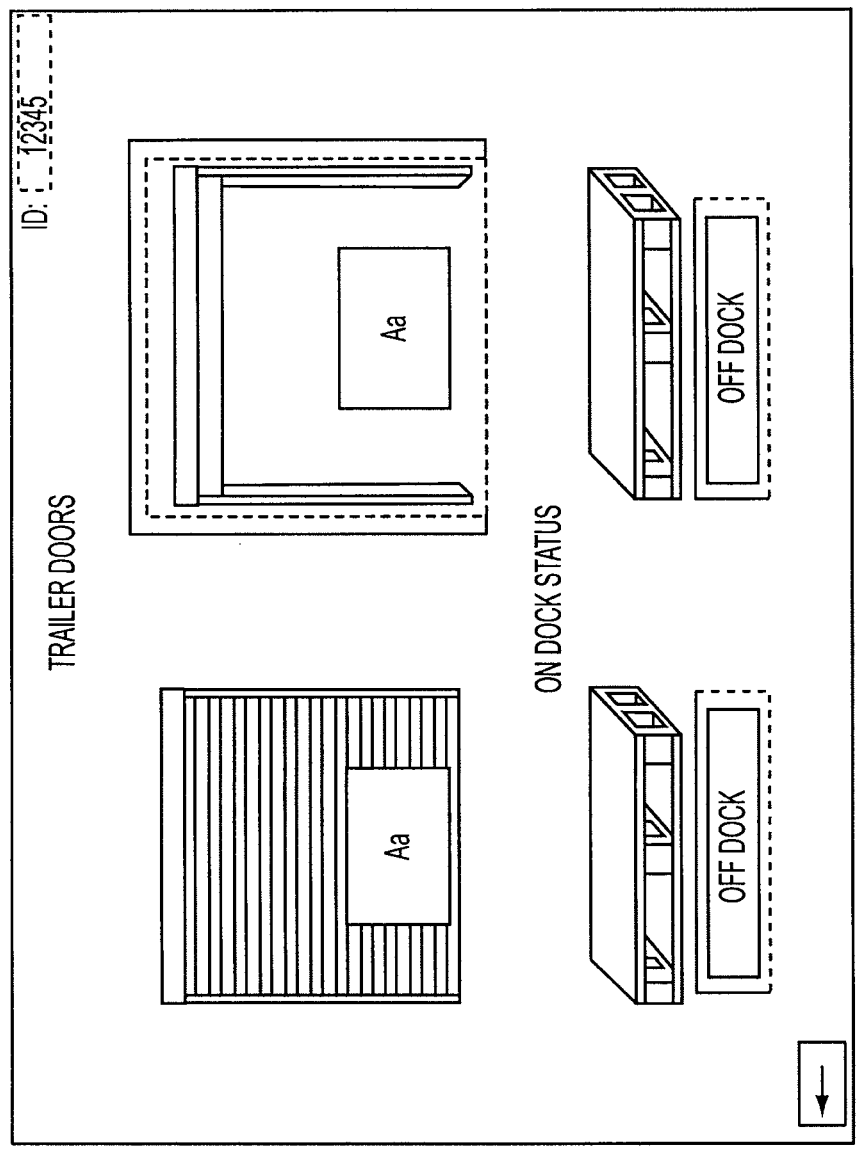
Figure 18:
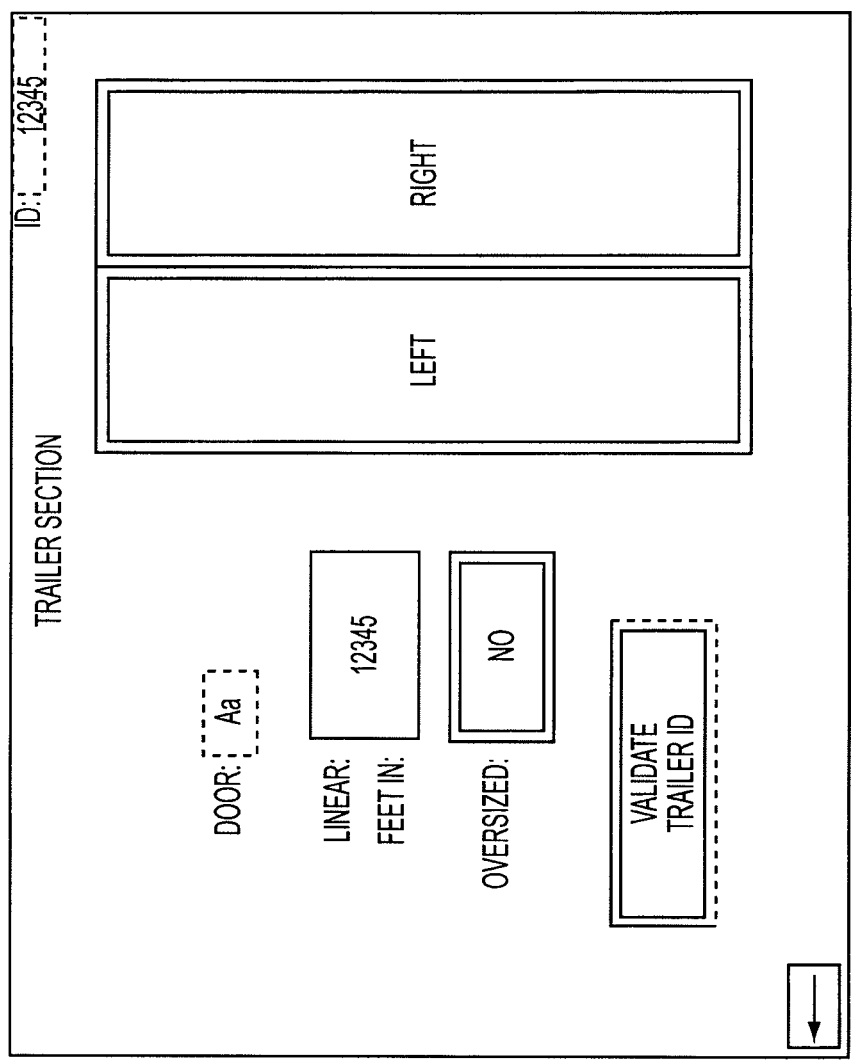

After the lift truck transports the freight shipment to the location indicated by the electronic manifest, the lift truck computing device 510 may receive input (e.g., information), via the location module 650, identifying the location where the freight was transported (Block 1030). As indicated above, this information may be received as automated input, e.g., via RFID tags, barcodes, or GPS, or as manual input from a user. Moreover, depending on the carrier, the location information may be detailed or general. For instance, continuing with the above example and as shown in FIGS. 17 and 18, the lift truck computing device 510, via the location module 650, may receive input indicating that the freight is now at door "Aa." After identifying the door, the lift truck computing device 510 may receive trailer information, e.g., a unique trailer number and/or information indicating the current location of the trailer. The lift truck computing device 510 may also receive information indicating the location of the freight inside the trailer. For instance, after arriving at door Aa, the lift truck operator may drive the lift truck 120 into the trailer through door Aa and deposit the freight on the left or right side of the trailer. This location information can be received by the lift truck computing device 510 as either automated or manual input. For instance, the lift truck operator may manually input that the freight was deposited five linear feet from the door on the left side of the trailer. Alternatively, this information may be received automatically using various means, such as RFID tags, barcodes, and/or photo sensors positioned within the trailer or outside the outbound door. The location information may be used for tracking freight shipments, properly balancing trailer loads, and/or identifying high-priority shipments that may need to be stripped out of the trailer first.

Figure 19:
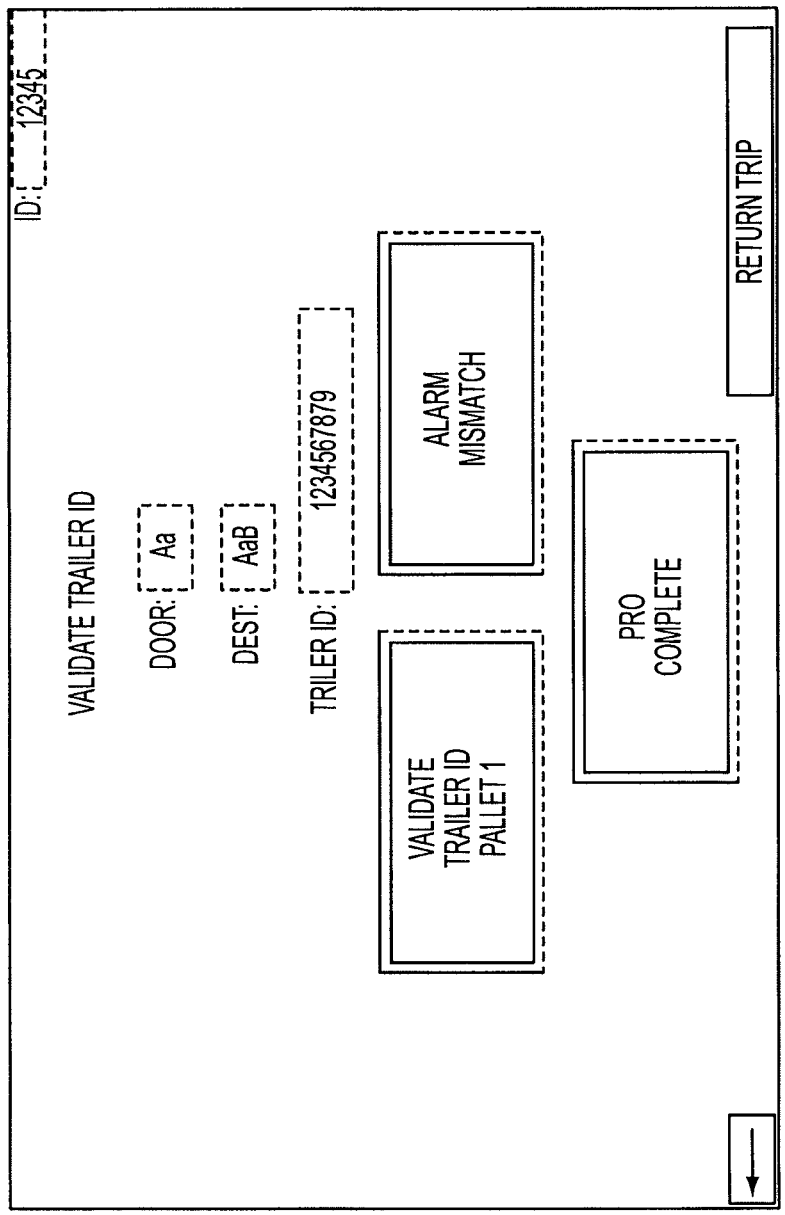

In one embodiment, after the lift truck computing device 510 has received the location information regarding the location of the freight shipment, the lift truck computing device 510 may receive a location validation (Block 1035). The term "location validation" is used generically to refer to input confirming the location of one or more freight shipments. In the shipping industry, double checking load and routing information for packages, freight shipments, and trailer loads is often good practice. For instance, if a freight shipment is misloaded or misrouted, the carrier may have to re-route the freight shipment and potentially compensate the consignor or consignee for any delay in delivery of the freight. To limit these situations, as shown in FIG. 19, the lift truck computing device 510 may cause display of a screen requesting a location validation. In response to this display, similar to location information, the lift truck computing device 510 may receive a location validation as automated or manual input. For instance, upon exiting the trailer, the lift truck operator may confirm via manual input that the freight was loaded into the correct trailer. If the freight is loaded into the correct trailer (or deposited at the correct location within the hub), the lift truck operator may continue stripping and/or loading trailers. If, however, the freight is misloaded or misrouted, the lift truck operator may need to transport the freight to the correct trailer or hub location. For misloaded or misrouted freight, a validation alert may be generated to advise the lift truck operator that there may be a problem with the freight. As with the other alerts, the term "validation alert" is used generically to indicate some form of notification that the freight may have been misloaded or misrouted. These alerts can be generated in ways similar to those discussed with respect to the inspection alerts and the classification alerts. As will be recognized, though, other alerts can also be generated, such as (1) a "priority alert" used to provide notification that a freight shipment is behind its guaranteed delivery date or requires special handling to meet its guaranteed delivery date or (2) a "hazardous material alert" used to provide notification that a freight shipment contains hazardous materials and may require special handling.

Figure 20:
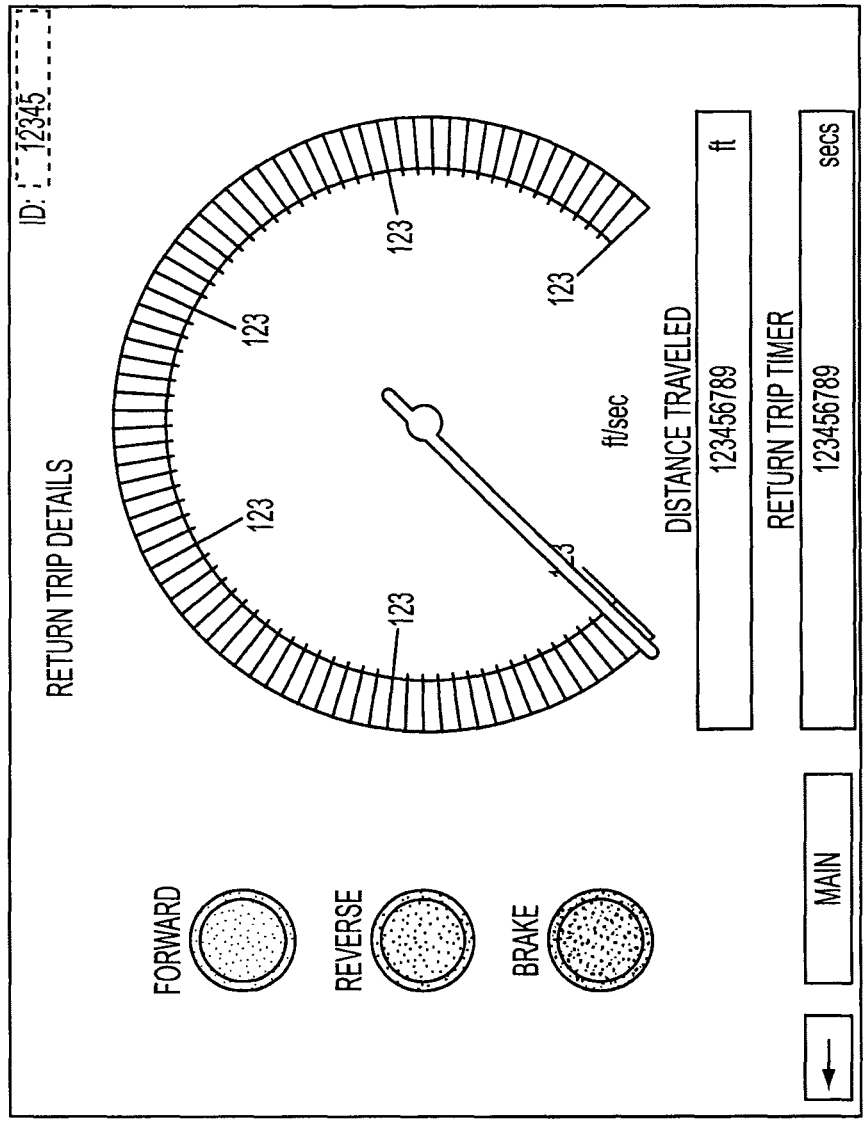

Continuing with the above example, after the lift truck computing device 510 receives a "location validation" indicating that the freight shipment is in the correct location, the driver may return to the stripping door and continue stripping the trailer. And as shown in FIG. 20, during the return trip, a transitional screen may be displayed to show information about the trip, e.g., speed, direction, and the like.

During the entire process of transporting freight shipments through a carrier's transportation network, the carrier, consignor, and consignee may have access to real-time current status information regarding each freight shipment. The term "current status information" is used generically to refer to the data or information about the location, the reweigh classification, trailer assignments, shipping data, handling instructions, and/or the like for freight shipments. In one embodiment, as the current status information is received by the lift truck computing device 510, the lift truck computing device 510 may transmit this information to the supervisory computing device 115 and/or the enterprise system 105. Alternatively, the enterprise system 105 (e.g., via the visibility module 350) and/or the supervisory computing device 115 (e.g., via the visibility module 470) may periodically poll the lift truck computing device 510 for current status information. With current status information, the enterprise system 105 and/or the supervisory computing device 115, via their respective visibility modules, can provide real-time current status information to the various entities (Block 1040). For example, a hub supervisor can monitor the progress of the freight moving through the hub, such as the current status of all dispatched shipments on the hub that have been stripped and loaded. Similarly, a consignor can track the progress of the freight shipment on its way to the consignee by accessing the carrier's website. This functionality provides real-time visibility for the freight shipments moving through the carrier's transportation network to consignors, consignees, and the carrier.

In addition to providing real-time current status information, the enterprise system 105 may generate a variety of reports (Block 1045) with data it receives or with data received by the lift truck computing device 510. Information in the reports may include lift truck operator efficiency, throughput of the carrier's transportation network or hub, under-classified freight (including patterns of a particular consignor), misloaded or misrouted freight shipments, and the like. As will be recognized, though, there are a variety of reports that can be generated with the information received and/or generated by the enterprise system 105, the local computing device 110, the supervisory computing device 115, the reweigh computing device 500, and the lift truck computing device 510.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for tracking the movement of freight shipments comprising:
    receiving, via an enterprise system, shipping data for a plurality of freight shipments, wherein (1) each of the plurality of freight shipments is associated with a unique tracking identifier for tracking the respective freight shipment's location through a carrier's transportation network, (2) the plurality of freight shipments is being transported through the carrier's transportation network, and (3) for each of the respective plurality of freight shipments, the shipping data comprises information identifying (a) the respective unique tracking identifier, (b) a respective final delivery destination, and (c) respective consignee information;
    generating, via the enterprise system, an electronic manifest comprising at least a portion of the shipping data for each of the plurality of freight shipments, the at least a portion of the shipping data identifying (1) the respective unique tracking identifiers associated with, and (2) the respective final delivery destinations of, the respective freight shipments being transported through the carrier's transportation network;

electronically transmitting, from the enterprise system, the electronic manifest;

receiving, via a lift truck computing device disposed on a lift truck, the electronic manifest;

displaying, via a display disposed on the lift truck, at least a portion of the electronic manifest;

receiving, via the lift truck computing device, input initiating a location event for a freight shipment of the plurality of freight shipments, wherein the location event indicates the location of the freight shipment;

receiving, via the lift truck computing device, inspection data in response to initiating the location event, the inspection data indicating a condition of freight of the freight shipment at the indicated location;

determining, via the lift truck computing device, whether the inspection data exceeds a plurality of predefined inspection threshold numeric values; and detecting, by lift truck detecting devices in communication with the lift truck computing device, an overage, or a shortage and damage of the freight of the freight shipment in response to determining that at least two of the predefined inspection threshold numeric values are exceeded.

2. The method of claim 1 further comprising displaying, via a supervisory computing device, current status information, the current status information indicating movement and shipment progress information associated with the freight shipment.

3. The method of claim 1 further comprising:
receiving, via a handheld electronic device, the shipping data associated with the freight shipment; and
electronically transmitting, from the handheld electronic device to the enterprise system, the shipping data associated with the freight shipment.

4. The method of claim 1, wherein the electronic manifest is transmitted using a first message file and a second message file, the first message file comprising handling instructions for the freight shipment and the second message file comprising at least a portion of the shipping data associated with the freight shipment.

5. The method of claim 1, wherein the location event further indicates that the freight shipment is being moved from a first location to a second location.

6. The method of claim 5 further comprising receiving information identifying the second location of the freight shipment.

7. The method of claim 5, wherein the information identifying the second location is received as input from a user.

8. The method of claim 5, wherein the information identifying the second location is received from one or more radio frequency identification (RFID) tags.

9. The method of claim 5, wherein the information identifying the second location is received from one or more barcode labels.

10. The method of claim 5, wherein the information identifying the second location indicates that the freight shipment is within a trailer identified by a unique trailer number, a side of the trailer in which the freight shipment is located, and a distance the freight shipment is within the trailer relative to a trailer door.

11. The method of claim 5 further comprising electronically transmitting, from the lift truck computing device to the enterprise system, at least a portion of the information identifying the second location of the freight shipment.

12. The method of claim 5 further comprising receiving, via the lift truck computing device, a location validation that confirms the second location of the freight shipment.

13. The method of claim 1 further comprising:
determining, via a reweigh computing device disposed on the lift truck, a weight of the at least a portion of the freight shipment;
electronically transmitting, from the reweigh computing device to the lift truck computing device, the weight determination of at least the portion of the freight shipment; and
receiving, via the lift truck computing device, the weight determination of at least the portion of the freight shipment.

14. The method of claim 13, wherein prior to automatically determining the weight, the method further comprises:
capturing, via an imaging device, one or more images of the freight shipment;
electronically transmitting the one or more images to the lift truck computing device;
determining, via a reweigh computing device disposed on the lift truck, a weight of the at least a portion of the freight shipment; and
electronically transmitting, from the reweigh computing device to the lift truck computing device, the weight determination of at least the portion of the freight shipment.

15. The method of claim 13, wherein prior to automatically determining the weight, the method further comprises:
receiving, via the lift truck computing device, one or more images captured by an imaging device; and
receiving, via the lift truck computing device, the weight determination of at least the portion of the freight shipment.

16. The method of claim 13 further comprising:
determining if a reweigh classification of the freight shipment and a billing classification of the freight shipment are substantially the same; and
generating a classification alert if the reweigh classification and the billing classification are not substantially the same.

17. The method of claim 16 further comprising updating the billing classification to indicate the reweigh classification of the freight shipment.

18. The method of claim 1, wherein the electronic manifest is received from the enterprise system.

19. The method of claim 1, wherein the electronic manifest is received from a supervisory computing device.

20. The method of claim 1, wherein shipping data is received for two or more freight shipments.

21. The method of claim 16 further comprising:
determining, via the lift truck computing device, the reweigh classification while the freight shipment is being transported through the carrier's transportation network.

22. The method of claim 1, further comprising:
designating, via the lift truck computing device, respective inspection thresholds, among a plurality of predefined inspection thresholds, to denote a predefined amount of freight overage, or freight shortage or freight damage that is acceptable for the freight of the freight shipment.

23. The method of claim 1, further comprising:
generating, via the lift truck computing device, an inspection alert in response to determining that the inspection data exceeds at least one of the predefined inspection threshold numeric values, the inspection alert notifies at least one entity that the at least one predefined inspection threshold numeric value is exceeded.

* * * * *